(12) United States Patent
Ichikawa et al.

(10) Patent No.: US 9,396,026 B2
(45) Date of Patent: Jul. 19, 2016

(54) ALLOCATING A TASK TO A COMPUTER BASED ON DETERMINED RESOURCES

(75) Inventors: Yujiro Ichikawa, Yokohama (JP); Yoshifumi Takamoto, Kokubunji (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 519 days.

(21) Appl. No.: 13/877,696

(22) PCT Filed: Dec. 16, 2010

(86) PCT No.: PCT/JP2010/072637
§ 371 (c)(1),
(2), (4) Date: May 9, 2013

(87) PCT Pub. No.: WO2012/056596
PCT Pub. Date: Mar. 5, 2012

(65) Prior Publication Data
US 2013/0227585 A1   Aug. 29, 2013

(30) Foreign Application Priority Data
Oct. 28, 2010   (JP) ................. 2010-241892

(51) Int. Cl.
*G06F 9/46* (2006.01)
*G06F 9/50* (2006.01)
*G06F 9/48* (2006.01)

(52) U.S. Cl.
CPC ............... *G06F 9/50* (2013.01); *G06F 9/4881* (2013.01); *G06F 9/505* (2013.01); *G06F 2209/485* (2013.01)

(58) Field of Classification Search
None
See application file for complete search history.

(56) References Cited

U.S. PATENT DOCUMENTS

| | | | | |
|---|---|---|---|---|
| 8,412,822 B1 * | 4/2013 | Weinman, Jr. | ........ | G06F 9/5027 709/201 |
| 2002/0194248 A1 * | 12/2002 | Wood | ..................... | G06F 9/5038 718/102 |
| 2004/0194061 A1 | 9/2004 | Fujino | | |
| 2007/0165525 A1 | 7/2007 | Kageyama | | |
| 2009/0198766 A1 | 8/2009 | Chen et al. | | |

FOREIGN PATENT DOCUMENTS

| | | | |
|---|---|---|---|
| GB | 2 274 345 | A | 7/1994 |
| JP | 06-214962 | A | 8/1994 |
| JP | 10-198643 | A | 7/1998 |
| JP | 2004-302937 | A | 10/2004 |
| JP | 2006-065658 | A | 3/2006 |
| JP | 2007-193471 | A | 8/2007 |
| JP | 2009-181578 | A | 8/2009 |

* cited by examiner

*Primary Examiner* — Mengyao Zhe
(74) *Attorney, Agent, or Firm* — Mattingly & Malur, PC

(57) ABSTRACT

A processing control method whereby a management server: assigns work to and executes said work on a computer; sets the processing start time and the processing end time for the aforementioned work as task execution information; sets a first physical resource amount, which is the amount of the physical resources of the aforementioned computer needed for execution of the aforementioned processing; acquires a second physical resource amount, which is the amount of the physical resources of the aforementioned computer that are being used; updates the processing start time for the aforementioned work to a time that is close to the current time when the aforementioned computer has the physical resources of the sum of the aforementioned first physical resource amount and the aforementioned second physical resources; and instructs the aforementioned computer to begin the aforementioned processing when the current time reaches the aforementioned processing start time.

12 Claims, 18 Drawing Sheets

| JOB IDENTIFIER (801) | SERVER IDENTIFIER (802) | JOB CHARACTERISTICS (1001) | | | | |
|---|---|---|---|---|---|---|
| | | LOAD CHARACTERISTIC (1002) | | | START TIME INSTANT (1006) | END TIME INSTANT (1007) |
| | | CPU (1003) | MEMORY (1004) | N/W (1005) | | |
| JOB A | PHYSICAL SERVER A | MEDIUM | MEDIUM | MEDIUM | 2010/07/29 17:00:00 | 2010/07/29 20:00:00 |
| JOB B | PHYSICAL SERVER B | MEDIUM | MEDIUM | MEDIUM | 2010/07/29 17:00:00 | 2010/07/30 00:00:00 |

JOB TABLE 118A

TASK EXECUTION TABLE 107

RESOURCE USAGE STATUS TABLE 119

EXECUTION PATTERN TABLE 108

JOB TABLE 118

RESOURCE USAGE STATUS TABLE 119A

Fig. 10

JOB TABLE 118A

| JOB IDENTIFIER (801) | SERVER IDENTIFIER (802) | JOB CHARACTERISTICS (1001) | | | | |
|---|---|---|---|---|---|---|
| | | LOAD CHARACTERISTIC (1002) | | | START TIME INSTANT (1006) | END TIME INSTANT (1007) |
| | | CPU (1003) | MEMORY (1004) | N/W (1005) | | |
| JOB A | PHYSICAL SERVER A | MEDIUM | MEDIUM | MEDIUM | 2010/07/29 17:00:00 | 2010/07/29 20:00:00 |
| JOB B | PHYSICAL SERVER B | MEDIUM | MEDIUM | MEDIUM | 2010/07/29 17:00:00 | 2010/07/30 00:00:00 |

Fig. 11

EXECUTABLE SERVER TABLE 121

| TASK IDENTIFIER (1101) | TARGET JOB (1102) | EXECUTABLE SERVER (1103) | |
|---|---|---|---|
| | | PHYSICAL SERVER A (1104) | PHYSICAL SERVER B (1105) |
| BACKUP | JOB A | ○ | ○ |
| BACKUP | JOB B | ○ | ○ |
| BATCH JOB | JOB A | ○ | — |
| BATCH JOB | JOB B | — | ○ |

Fig. 12

| TASK IDENTIFIER 501 | TARGET JOB 502 | START TIME INSTANT 503 | END TIME INSTANT 504 | STATUS 505 | EXECUTED PLACE 1201 |
|---|---|---|---|---|---|
| BATCH JOB | JOB A | 2010/07/30 01:00:00 | 2010/07/30 02:00:00 | IN EXECUTION | PHYSICAL SERVER A |
| BATCH JOB | JOB B | 2010/07/30 01:00:00 | 2010/07/30 02:00:00 | IN EXECUTION | PHYSICAL SERVER B |
| BACKUP | JOB A | 2010/07/30 03:00:00 | 2010/07/30 06:00:00 | UNEXECUTED | PHYSICAL SERVER A |
| BACKUP | JOB B | 2010/07/30 03:00:00 | 2010/07/30 06:00:00 | UNEXECUTED | PHYSICAL SERVER A |

TASK EXECUTION TABLE 107A

Fig. 13

| PATTERN | TARGET JOB | COVERAGE | | PRIORITY |
| --- | --- | --- | --- | --- |
| | | JOB A | JOB B | |
| BACKUP OF FILE SYSTEM | JOB A | O | — | HEAVY |
| BACKUP OF FILE SYSTEM | JOB B | — | O | HEAVY |
| COPY OF LOGICAL VOLUME | JOB A | O | O | LIGHT |
| COPY OF LOGICAL VOLUME | JOB B | O | O | LIGHT |
| CREATION OF SNAPSHOT | JOB A | O | — | MEDIUM |
| CREATION OF SNAPSHOT | JOB B | — | O | MEDIUM |

TASK SATISFIABILITY TABLE 120

Fig. 14

| TASK IDENTIFIER | TARGET JOB | START TIME INSTANT | END TIME INSTANT | STATUS | EXECUTED PLACE | PATTERN |
|---|---|---|---|---|---|---|
| BATCH JOB | JOB A | 2010/07/30 01:00:00 | 2010/07/30 02:00:00 | IN EXECUTION | PHYSICAL SERVER A | |
| BATCH JOB | JOB B | 2010/07/30 01:00:00 | 2010/07/30 02:00:00 | IN EXECUTION | PHYSICAL SERVER B | |
| BACKUP | JOB A | 2010/07/30 03:00:00 | 2010/07/30 06:00:00 | UNEXECUTED | PHYSICAL SERVER A | COPY OF LOGICAL VOLUME |
| BACKUP | JOB B | 2010/07/30 03:00:00 | 2010/07/30 06:00:00 | UNEXECUTED | PHYSICAL SERVER A | COPY OF LOGICAL VOLUME |

TASK EXECUTION TABLE 107B

Fig. 18

| TASK IDENTIFIER | PATTERN | USED RESOURCES | | |
|---|---|---|---|---|
| | | CPU | MEMORY | N/W |
| BACKUP | BACKUP OF FILE SYSTEM | MEDIUM | HEAVY | HEAVY |
| BACKUP | COPY OF LOGICAL VOLUME | LIGHT | LIGHT | LIGHT |
| BACKUP | CREATION OF SNAPSHOT | MEDIUM | MEDIUM | LIGHT |

EXECUTION PATTERN TABLE 108A

ALLOCATING A TASK TO A COMPUTER BASED ON DETERMINED RESOURCES

INCORPORATION BY REFERENCE

The present application claims priority from Japanese patent application JP 2010-241892 filed on Oct. 28, 2010, the content of which is hereby incorporated by reference into this application.

BACKGROUND

This invention relates to a computer system including a server virtualization module, and more particularly, to a technology for determining a method of controlling processing running on a server.

As a method of controlling a plurality of virtualized servers (hereinafter referred to as "virtual servers") to run on one physical server, there is a server virtualization module, and examples of the server virtualization module include VMware. As a method relating to effective use of physical resources in a system environment including the server virtualization module, there is allocation to processing that periodically occurs (hereinafter referred to as "periodic job") such as a batch job or a backup (for example, Japanese Patent Application Laid-open No. 2009-181578). In the method disclosed in Japanese Patent Application Laid-open No. 2009-181578, a change in a resource request issued from the virtual server is monitored based on an activity of an application running on the virtual server, and resource allocation to the virtual server is dynamically adjusted.

SUMMARY

However, in a server virtualization environment, another virtual server running on a given virtual server is subject to influences of load on the same physical server (for example, network transfer or disk input/output (I/O) efficiency). This is because physical resources (such as CPU, memory, network device, and host bus adapter (HBA) are shared by the virtual servers.

Those influences affect processing efficiency of a periodic task performed for the job. For example, in a case where the periodic task that requires a network bandwidth such as the backup is executed on the virtual server, an execution time thereof changes depending on whether or not another virtual server running on the same physical server is using a large amount of network bandwidth. This causes a fear that the task cannot be finished within the execution time estimated at a time of design and that a job or task that is to be executed after the periodic task is finished cannot be started at a scheduled time instant.

Therefore, an object to be achieved by this invention is to execute a task before an original start time instant in a state in which there is room for physical resources in order to complete a periodic task before a target completion time instant.

A representative aspect of this invention is as follows. A processing control method for controlling processing for a job in a computer system, the computer system comprising: a computer comprising a processor and a memory; and a management server comprising a processor and a memory, for managing the job, processing for the job, and physical resources of the computer, the management server retaining: task execution information comprising a start time instant of the processing for the job and an end time instant of the processing; and task resource information comprising a first physical resource amount being a physical resource amount of the computer necessary to execute the processing, the processing control method comprising: a first step of assigning, by the management server, the job to the computer and controlling the computer to execute the assigned job; a second step of setting, by the management server, the start time instant and the end time instant in the task execution information; a third step of setting, by the management server, the first physical resource amount in the task resource information; a fourth step of acquiring, by the management server, a second physical resource amount being a used amount of the physical resources of the computer; a fifth step of determining, by the management server, whether or not the computer comprises the physical resources satisfying a sum of the first physical resource amount and the second physical resource amount; a sixth step of updating, by the management server, when it is determined that the physical resources of the computer satisfy the sum of the first physical resource amount and the second physical resource amount, the start time instant of the processing for the job set in the task execution information to a time instant close to a present time instant; and a seventh step of referring, by the management server, to the task execution information to instruct the computer to start the processing when the present time instant reaches the start time instant of the processing.

Accordingly, according to the exemplary embodiment of this invention, it is possible to reduce the risk that the task cannot finish being processed before the target completion time instant.

BRIEF DESCRIPTION OF THE DRAWINGS

FIG. 10 illustrates an example of the job table according to the second embodiment of this invention.

FIG. 11 illustrates an example of the executable server table according to a third embodiment FIG. 12 illustrates an example of the task execution table according to the third embodiment of this invention.

FIG. 13 illustrates an example of the task satisfiability table according to a fourth embodiment of this invention.

FIG. 14 illustrates an example of the task execution table according to the fourth embodiment of this invention.

FIG. 18 illustrates an example of the execution pattern table according to the fourth embodiment of this invention.

DETAILED DESCRIPTION OF THE PREFERRED EMBODIMENTS

Embodiments of this invention are described below with reference to the accompanying drawings.

(First Embodiment)

Figure 1:
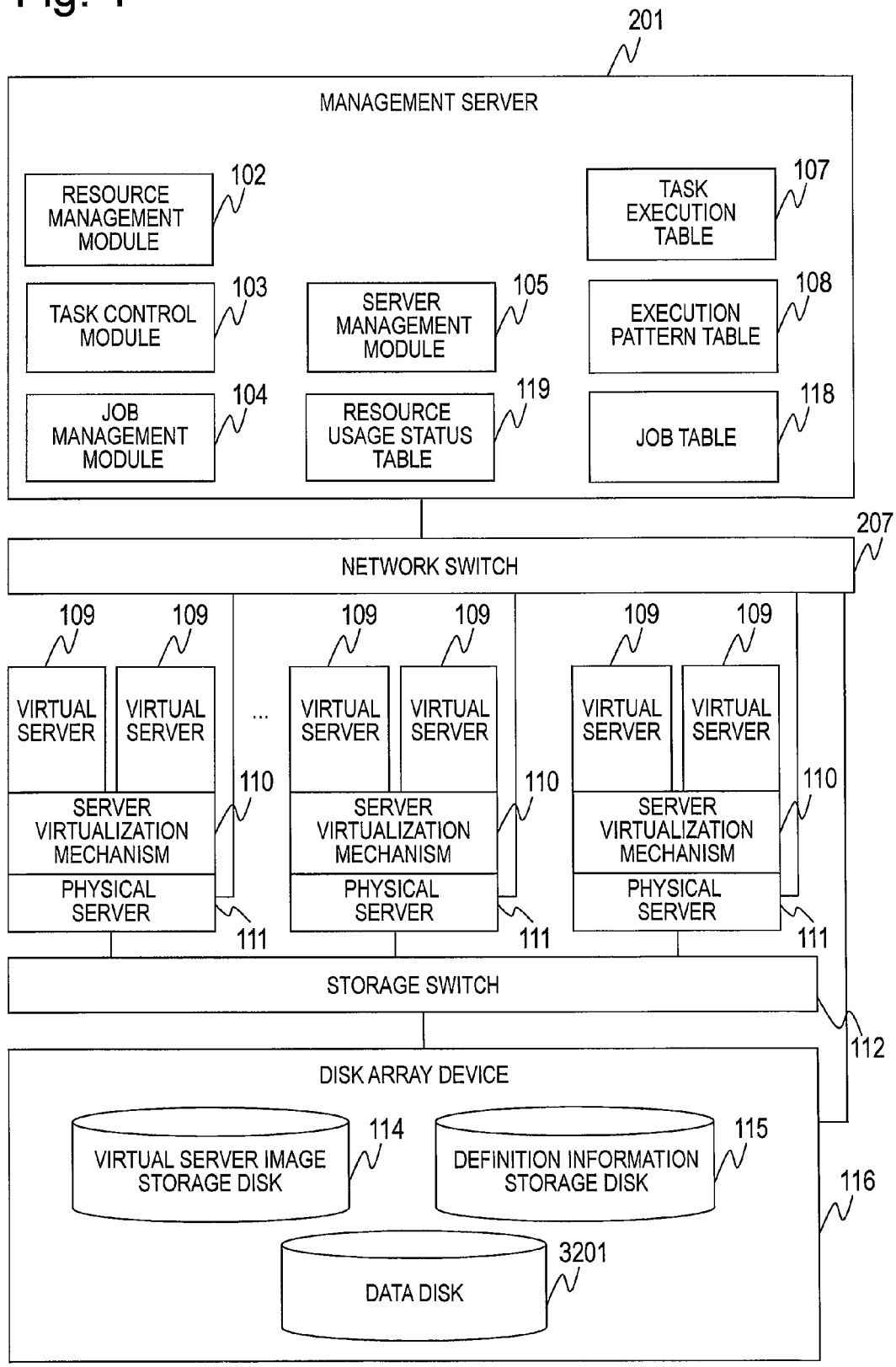
FIG. 1 is a block diagram illustrating a configuration of a computer system including a server virtualization mechanism according to a first embodiment of this invention.

FIG. 1 is a block diagram illustrating a configuration of a computer system including a server virtualization module according to a first embodiment of this invention.

The computer system includes a management server 201, at least one physical server 111, at least one network switch 207, at least one storage switch 112, and a disk array device 116.

The management server 201 is a computer controlled by a program to be executed, and includes a NIC 205 coupled to the network switch 207. The management server 201 is coupled to the physical server 111 and the disk array device 116 via the network switch 207. The management server 201 realizes respective functions of a resource management module 102, a task control module 103, a job management module 104, and a server management module 105, and as tables necessary for processing by those modules, includes a resource usage status table 119, a task execution table (task execution information) 107, an execution pattern table (task resource information) 108, and a job table 118. The respective tables are described later with reference to structure examples of the tables illustrated in FIG. 5 and the subsequent figures.

The physical server 111 is a computer controlled by a program to be executed, and includes a NIC coupled to the network switch 207 and a host bus adapter (HBA) coupled to the storage switch 112. The physical server 111 is coupled to another physical server 111, the management server 201, and the disk array device 116 via the network switch 207. The physical server 111 is coupled to the disk array device 116 via the storage switch 112. It should be noted that the storage switch 112 forms a storage area network (SAN) 112A. The physical server 111 realizes respective functions of a server virtualization module 110 (or server virtualization module) and a virtual server 109.

The network switch 207 is at least one network device that forms a network 207A. The network device is specifically at least one of a network switch, a router, a load balancer, and a firewall.

The disk array device 116 is a storage system provided with a fiber channel (FC) and a LAN interface and including at least one of at least one disk and at least one nonvolatile semiconductor storage device that is used by the management server 201 and the physical server 111. The disk array device 116 includes a virtual server image storage disk 114 and a definition information storage disk 115 as disks necessary to execute the server virtualization module 110 and the virtual server 109. The virtual server image storage disk 114 is a disk volume (or logical volume) including a disk image that forms the virtual server 109.

The definition information storage disk 115 is a disk volume (or logical volume) including metadata that describes details of virtualized devices (such as virtual processor, virtual memory, and virtual I/O device) allocated to the virtual server 109 and an operating system (OS) and a job 320 that are installed on the virtual server 109.

The disk array device 116 includes a data disk 3201 as a logical volume for storing job data used by the job executed on the virtual server 109. The data disk 3201 may be generated on a job-to-job basis, or may be set as a shared volume that allows a plurality of jobs (or virtual servers 109) to share one logical volume.

Figure 2:
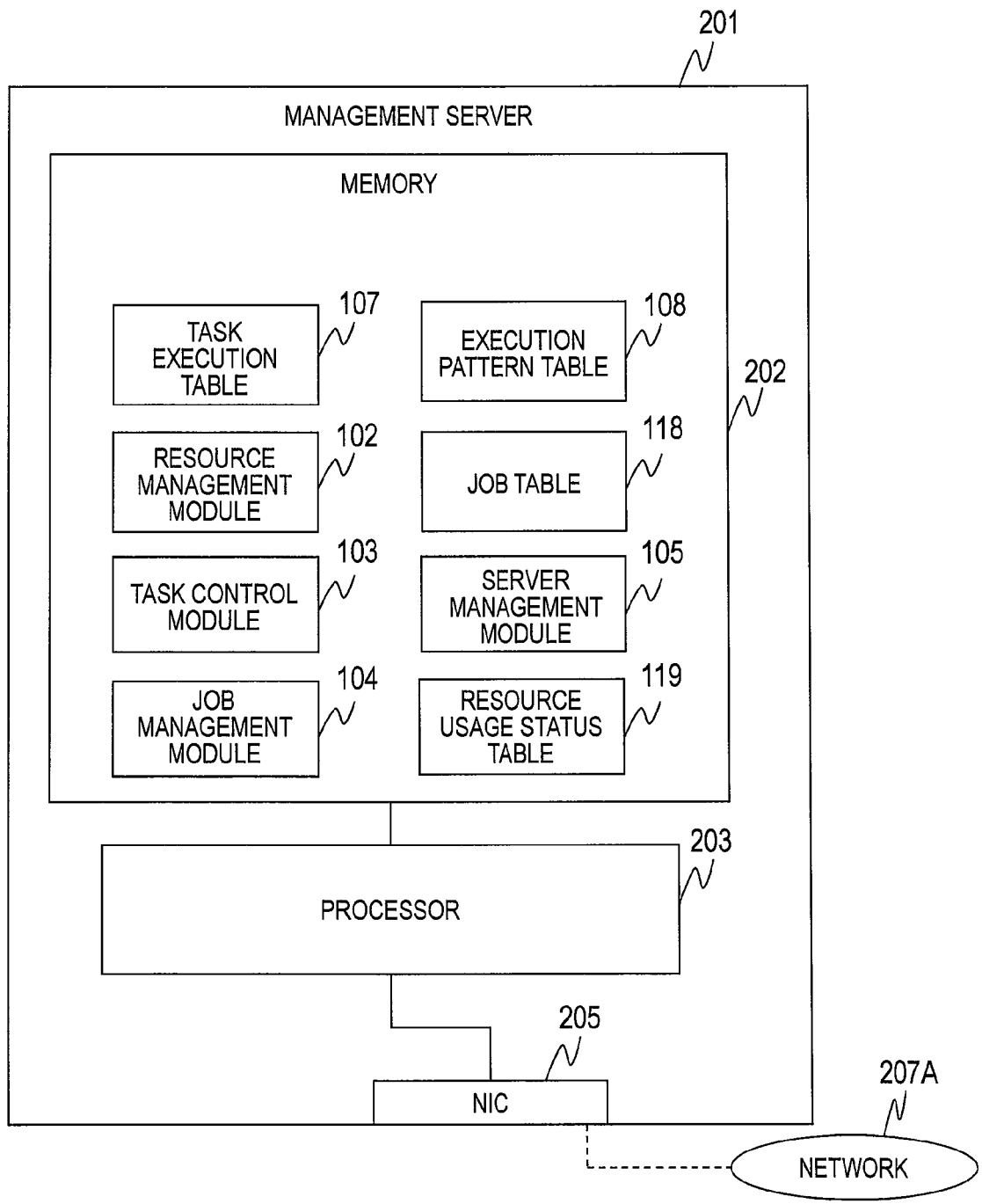
FIG. 2 illustrates a configuration of the management server according to the first embodiment of this invention.

FIG. 2 illustrates a configuration of the management server 201. The management server 201 includes the resource management module 102, the task control module 103, the job management module 104, and the server management module 105. It should be noted that in this embodiment, the resource management module 102, the task control module 103, the job management module 104, and the server management module 105 are described as programs executed by a processor (CPU) 203, but may be implemented by hardware or firmware mounted to the management server 201 or a combination thereof. Further, the resource management module 102, the task control module 103, the job management module 104, and the server management module 105 are stored on an auxiliary storage device provided to the management server 201, and at a time of execution, loaded into a memory 202 to be executed by the processor 203.

The resource management module 102 collects load information (such as CPU activity ratio and memory usage) on each physical server 111 from the physical server 111, and retains the load information. The task control module 103 manages an execution status of the task necessary for the job executed on the virtual server 109, and transmits an instruction to execute the task to the virtual server 109.

The job management module 104 retains information for associating the physical server 111 with the job running on the virtual server 109 on the physical server 111. The server management module 105 collects configuration information (such as host name, type of operating system, and device information) relating to each physical server 111 from the physical server 111, and retains the configuration information. Then, the server management module 105 controls the virtual server 109 on the physical server 111 by instructing the server virtualization module 110 of the physical server 111 to generate, migrate, or delete the virtual server 109 based on an instruction issued by an administrator or the like. Further, the server management module 105 can control the job 320 executed on the virtual server 109. For example, the server management module 105 selects the physical server 111 that is to perform the job 320, and assigns the job 320 to the virtual server 109 on the selected physical server 111. By executing the job 320, the virtual server 109 can provide the job 320 to a client terminal or the like (not shown).

The management server 201 includes the NIC 205 for coupling to the network 207A. The management server 201 is coupled to the physical server 111 and the disk array device 116 through the network 207A. The management server 201 may include a plurality of NICs.

Figure 3:
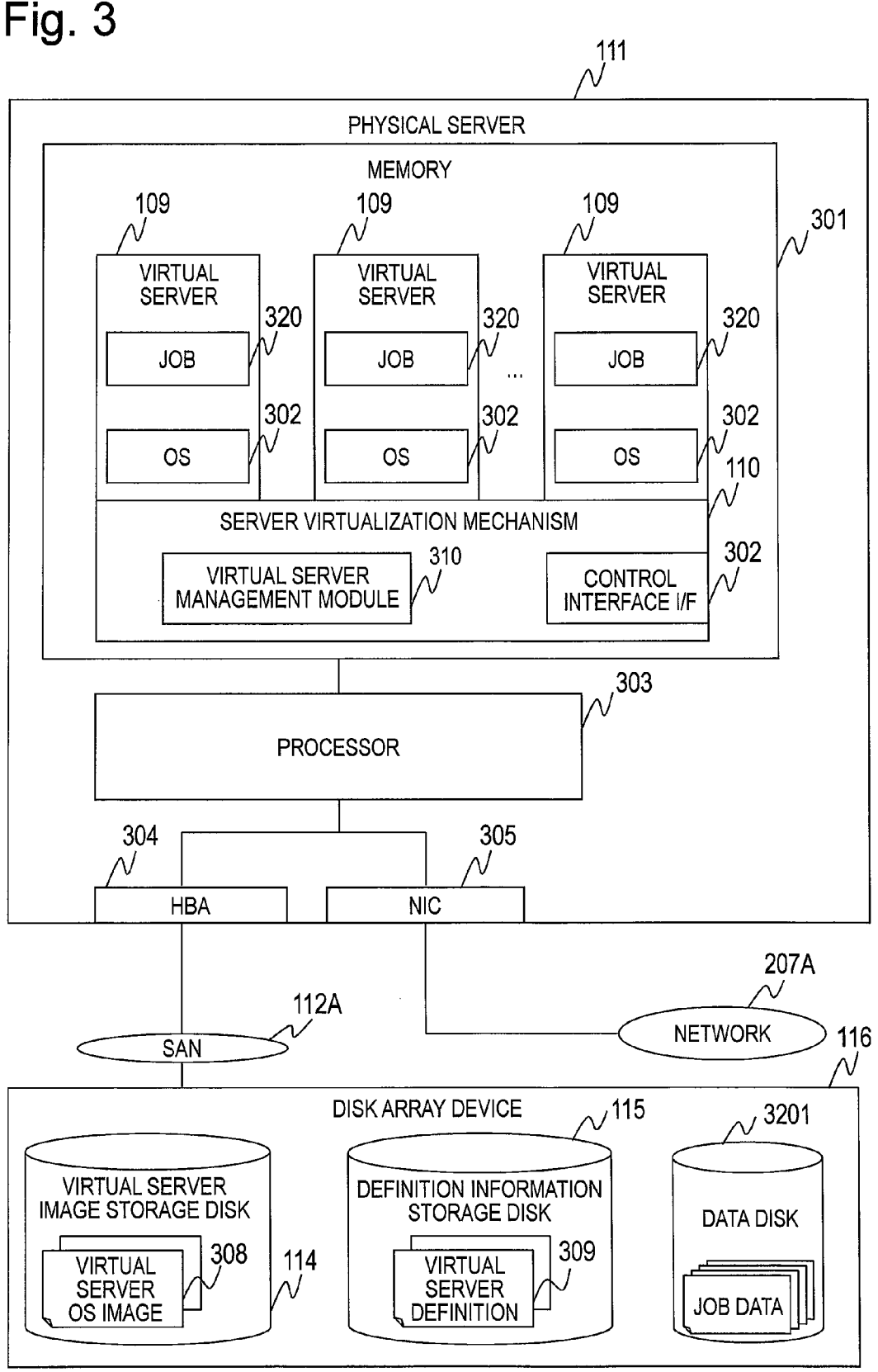
FIG. 3 illustrates a configuration of the physical server according to the first embodiment of this invention.

FIG. 3 illustrates a configuration of the physical server 111. The physical server 111 includes a memory 301 and a processor 303. The memory 301 retains programs for executing the server virtualization module 110 and the virtual server 109.

The physical server 111 includes a NIC 305 for coupling to the network 207A. The physical server 111 is coupled to the management server 201 and another physical server 111 through the network 207A. The physical server 111 includes a host bus adapter (HBA) 304 for coupling to the disk array device 116 through the SAN 112A. The physical server 111 may include a plurality of NICs and HBAs.

The server virtualization module 110 includes a virtual server management module 310 and a control interface (I/F) 302. The server virtualization module 110 provides a plurality of virtual servers 109 by virtualizing computer resources of the physical server 111. The server virtualization module 110 can be formed of, for example, a virtual machine monitor (VMM) or a hypervisor. This embodiment is described by taking an example in which the VMM is employed as the server virtualization module 110.

The virtual server management module 310 collects, retains, and updates the load information (such as CPU activity ratio and memory usage), configuration information (such as type of OS and allocated virtual device), and status information (such as power supply, enabled or disabled state of device, presence/absence of failure in device) on the virtual server 109. The control interface 302 provides a user interface that allows an external portion (such as management server 201 or another physical server 111) to access the virtual server management module 310.

On the server virtualization module 110, at least one virtual server 109 is executed. The virtual server 109 is a virtualized server that functions by having the computer resources of the physical server 111 allocated thereto by the server virtualization module 110. On the virtual server 109, processing (such as software or program) for providing an OS 302 and the job 320 is executed.

Figure 4:
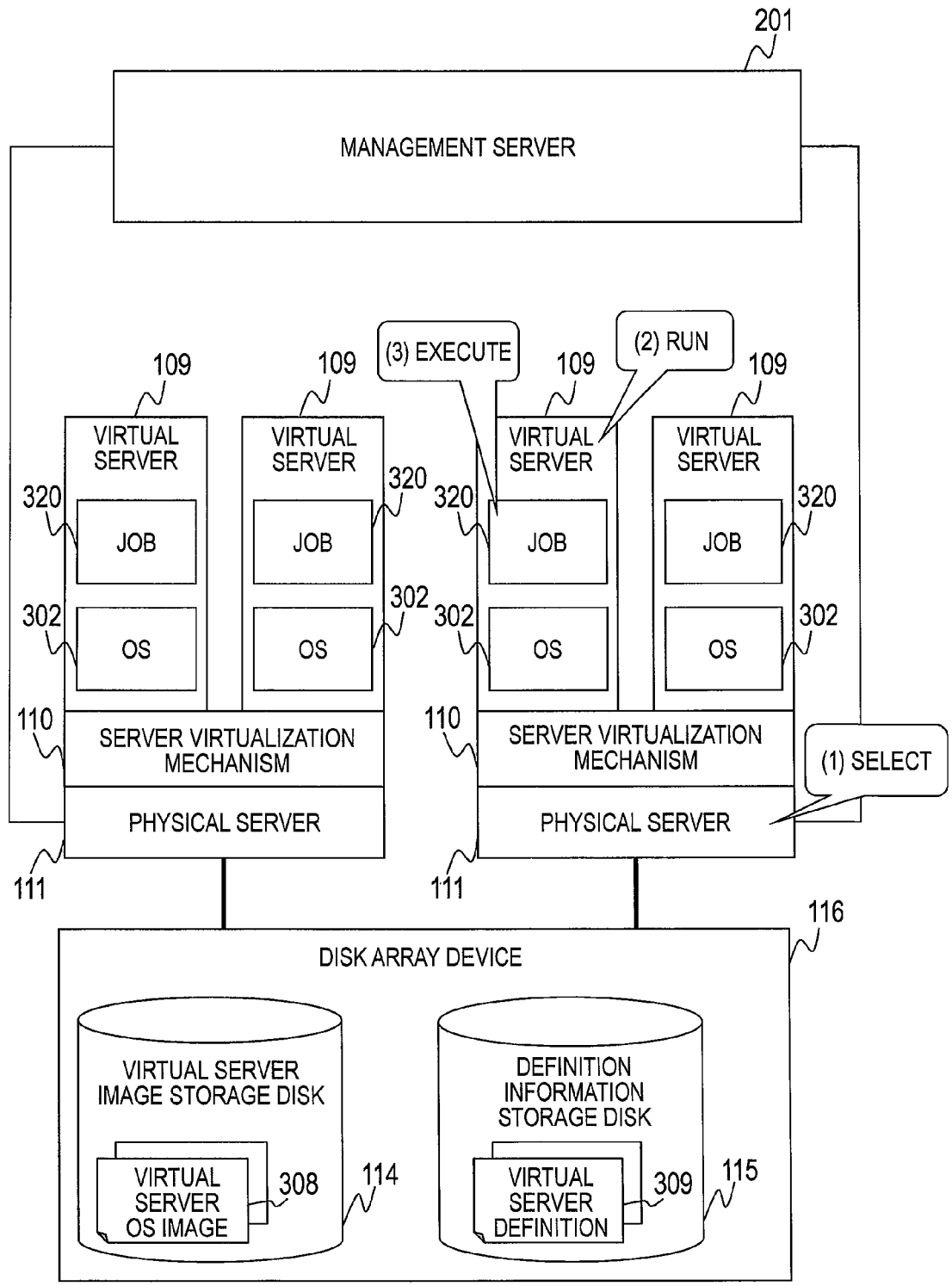
FIG. 4 illustrates an example of a flow of the processing between the management server 201 and at least one physical server according to the first embodiment of this invention.

FIG. 4 illustrates an example of a flow of the processing between the management server 201 and at least one physical server 111. This example shows a method of executing the periodic job 320 before a scheduled start time instant in a state in which there is room for the physical resources of the computer.

First Processing (1)

The management server 201 selects the physical server 111 under light load based on the information retained by the resource management module 102. In this processing, as described later, the resource management module 102 compares the load information collected from the respective physical servers 111 with a threshold value set in advance, and selects the physical server 111 having small load information as the physical server 111 under light load.

Second Processing (2)

The server management module 105 controls the virtual server 109 for the periodic job 320 to run on the physical server 111 selected by the resource management module 102 in the first processing. When the periodic job 320 can be executed on the already-booted virtual server 109, the server management module 105 controls the virtual server 109 to execute the periodic job 320. When there is no virtual server 109 that can execute the periodic job 320 among the already-booted virtual servers 109 on the selected physical server 111, the server management module 105 generates a new virtual server 109 for executing the periodic job 320.

Third Processing (3)

The task control module 103 instructs the virtual server 109 controlled to run in the second processing to execute a predetermined task for carrying out the periodic job 320.

Through the above-mentioned processing, the virtual server 109 on the physical server 111 under light load executes the task set in advance for the periodic job 320.

In this example, a relationship between the periodic job 320 and the task is as follows. The job 320 is processing for providing a service to a client computer (not shown) that accesses the virtual server 109 via the network 207A, such as a Web server, an application server, or a database server.

On the other hand, the task is processing executed for each job 320, for example, processing performed for the job data that is stored on the data disk 3201 and set in advance for each job 320 such as the backup of the data disk 3201 used by the job 320 or a batch job (for example, daily update or monthly update) set in advance. In addition, a start time instant to start the task and an end time instant to get the task completed are set for the task. It should be noted that it is permitted to start the task before the start time instant, but the end time instant is a time instant past which it is not permitted to continue execution of the task and by which the task is to be completed.

Figure 5:
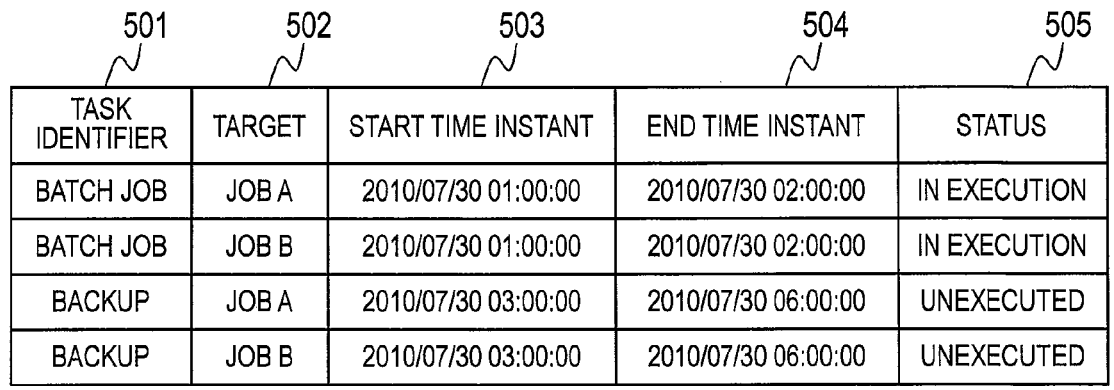
FIG. 5 illustrates an example of the task execution table according to the first embodiment of this invention.

FIG. 5 illustrates an example of the task execution table 107. The task execution table 107 retains the task necessary for the periodic job 320 and information relating to the execution thereof. A column 501 stores an identifier for identifying a description (kind) of the task. A column 502 stores an identifier for identifying the job 320 for which the task indicated by the column 501 is to be executed. This embodiment is described on the assumption that this identifier is used to identify the job 320, but an identifier for identifying the virtual server 109 may be used.

A column 503 is a time instant to start the execution of the task designated by a task identifier 501 and a target 502. A column 504 is a time instant to get the execution of the column 501 completed. Initial values of the column 503 and the column 504 are set in advance by the user (such as job manager) based on a service level agreement (SLA) or the like. A column 505 indicates an execution status of the task designated by the column 501. This embodiment is described on the assumption that the execution status has three kinds of "unexecuted", "in execution", and "executed", but a degree of progress in processing (such as % or number of steps forming the task) or the like may be used.

The task control module 103 monitors the task execution table 107 periodically (at predetermined cycles), and instructs the virtual server 109 to execute the task having a start time instant 503 behind the present time instant among the tasks whose column 505 is "unexecuted". It should be noted that the comparison between the start time instant of the column 503 and the present time instant may take into consideration the time required for the task to become an executable status in, for example, startup processing for the task on the virtual server 109.

Figure 6:
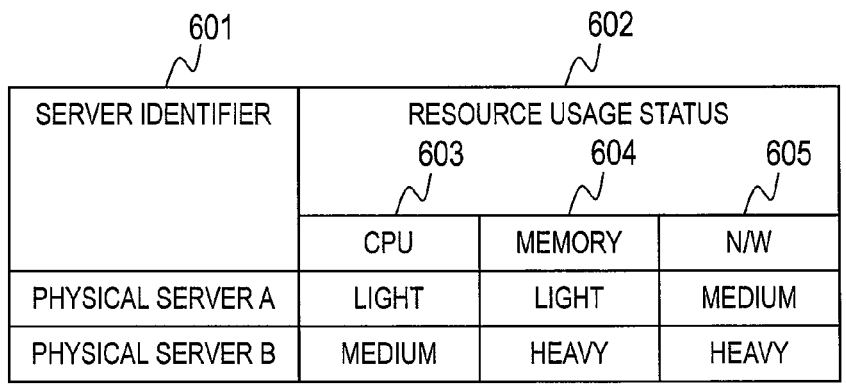
FIG. 6 illustrates an example of the resource usage status table according to the first embodiment of this invention.

FIG. 6 illustrates an example of the resource usage status table 119. The resource usage status table 119 retains information relating to use degrees of the physical resources on the physical server 111. The resource usage status table 119 stores a usage degree for each computer resource which is calculated by comparing the load information on each computer resource collected by the resource management module 102 with the threshold value set in advance.

A column 601 stores an identifier for identifying the physical server 111. A column 602 indicates the use degrees of the respective physical components (such as processor (CPU), memory, and network bandwidth (indicated by N/W in the figure)) provided to the physical server 111. The use degrees indicate amounts of the physical resources used by the processing executed on the physical server 111. In this embodiment, the column 602 includes, as sub-columns, a column 603, a column 604, and a column 605. The column 603 stores the usage degree of the processor 303, the column 604 stores the usage degree of the memory 301, and the column 605 stores a usage rate of the network bandwidth of the NIC 305.

It should be noted that the resource usage status table 119 may include columns that store the use degrees of a disk I/O bandwidth, a disk area, and the like separately from the column 603, the column 604, and the column 605. The values of the column 603, the column 604, and the column 605 are periodically updated by being calculated by the resource management module 102 based on the load information on the server virtualization module 110 and the virtual server 109 acquired from the virtual server management module 310 of the server virtualization module 110.

For example, the respective usage degrees illustrated in FIG. 6 shows an example in which the usage rates (or used amounts) are obtained from the load information on the physical computer resources measured by the server virtualization module 110 of the physical server 111, the usage rates of the respective computer resources are compared with a predetermined threshold value (two threshold values in the example illustrated in the figure), and the usage degrees are set to have three steps of "heavy", "medium", and "light". In other words, the usage degree is set as "light" when the usage rate is less than a first threshold value, the usage degree is set as "medium" when the usage rate is equal to or larger than the first threshold value and less than a second threshold value, and the usage degree is set as "heavy" when the usage rate is equal to or larger than the second threshold value. It should be noted that the example illustrated in the figure shows the example in which the three usage degrees are obtained by using the two threshold values, but the administrator can set a desired number of threshold values.

In this example, the usage rate of the processor 303 indicates the usage degree obtained by using the threshold value from the usage rate of the processor 303 acquired from the server virtualization module 110 by the resource management module 102.

The use degree of the memory 301 indicates the usage degree obtained by the resource management module 102 by using the threshold value from a ratio of the amount of the memory 301 actually used by the server virtualization module 110 to the amount of the memory 301 implemented on the physical server 111. Further, with regard to the usage degree of the network, a ratio of an actual communication amount used by the server virtualization module 110 to a maximum transfer speed of the NIC 305 is obtained as the usage rate, and the usage degree is calculated by using the threshold value by the resource management module 102.

It should be noted that in this embodiment, levelization using the threshold value is described as a calculation method for this usage rate, but a ratio of a used physical resource amount to a physical resource amount or other such ratio may be used.

Figure 7:
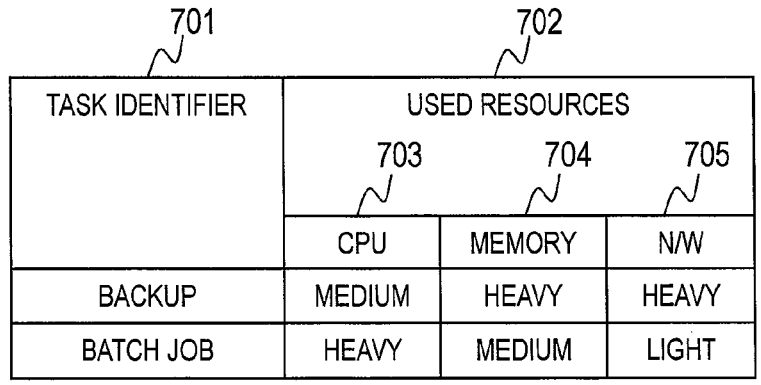
FIG. 7 illustrates an example of the execution pattern table according to the first embodiment of this invention.

FIG. 7 illustrates an example of the execution pattern table 108. The execution pattern table 108 stores the kind of the task necessary for the periodic job 320 and information relating to characteristics of the computer resources necessary to execute the task.

A column 701 stores the identifier for identifying the description (kind) of the task. As this identifier, the same identifier as the identifier used for the column 501 of the task execution table 107 illustrated in FIG. 5 is used. A column 702 retains information relating to the use degrees of the physical resources necessary to execute the task indicated by the column 701. This use degree indicates the amount of the physical resources used when the physical server 111 executes the task.

The column 702 includes, as the sub-columns, a column 703, a column 704, and a column 705, and indicate the use degrees of the respective physical computer resources (such as processor, memory, or network bandwidth) provided to the physical server 111. The execution pattern table 108 may include columns that store the use degrees of the disk I/O bandwidth, the disk area, and the like separately from the column 703, the column 704, and the column 705. The values of the column 703, the column 704, and the column 705 are set based on settings made by the administrator, the load information collected in the past task execution, and the like. It should be noted that when the administrator sets the use degrees of the computer resources, the use degrees can be input from the console (input/output device such as a keyboard or a mouse and output device such as a display) (not shown) of the management server 201.

Figure 8:
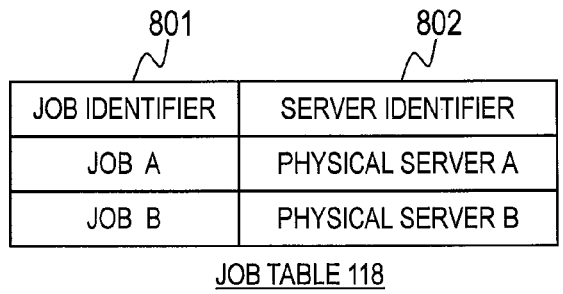
FIG. 8 illustrates an example of the job table according to the first embodiment of this invention.

FIG. 8 illustrates an example of the job table 118. The job table 118 retains information indicating characteristics of the job 320 running on the physical server 111. A column 801 stores an identifier for identifying the job. As this identifier, the same identifier as the identifier used for the column 502 of the task execution table 107 illustrated in FIG. 5 is used. A column 802 is an identifier for identifying the physical server 111 on which the job indicated by the column 801 runs. As this identifier, the same identifier as the identifier used for the column 601 of the resource usage status table 119 illustrated in FIG. 6 is used.

Figure 15:
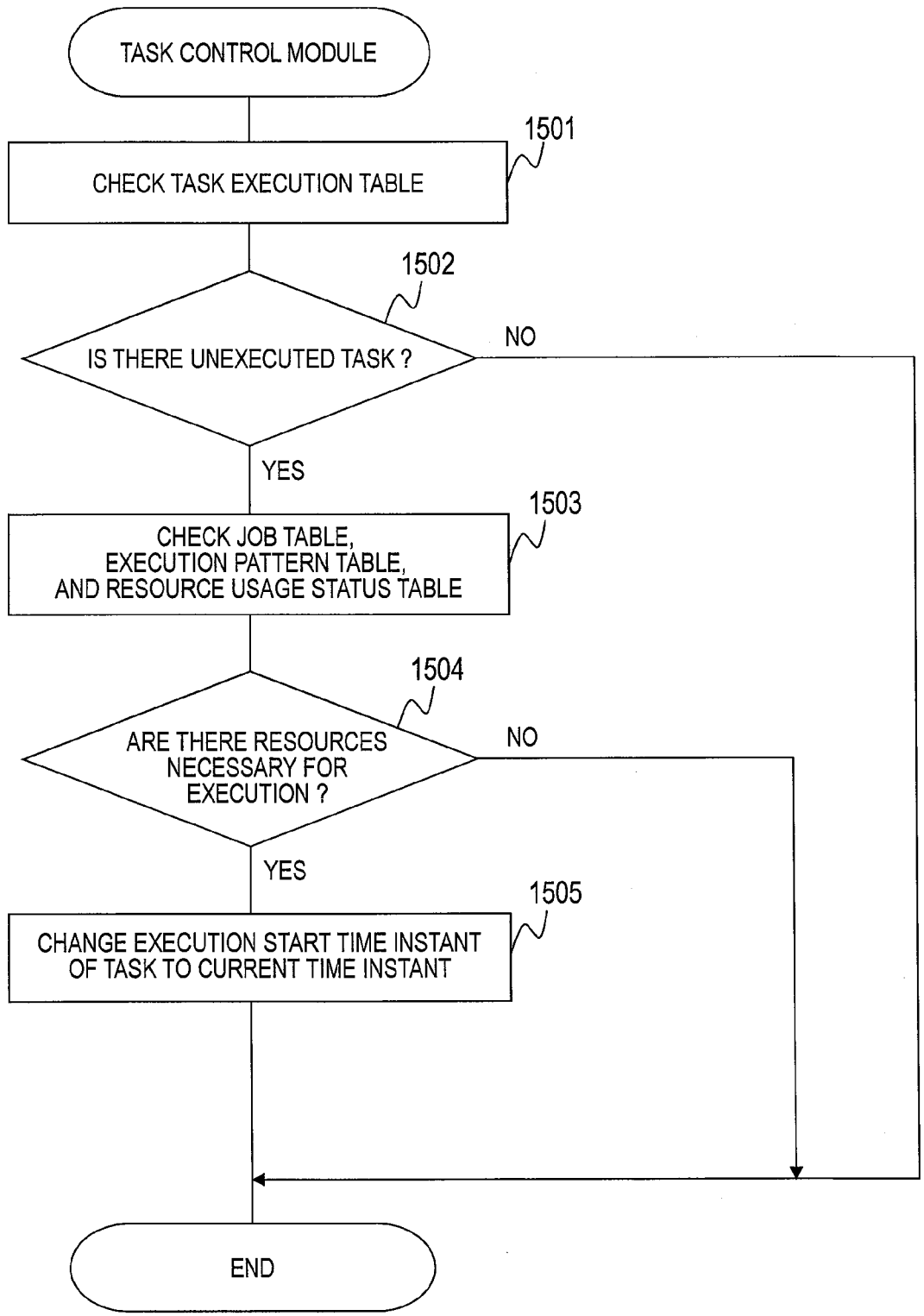
FIG. 15 is a flowchart illustrating an example of processing executed by the task control module according to the first embodiment of this invention.

FIG. 15 is a flowchart illustrating an example of processing executed by the task control module 103. As illustrated in the first processing of FIG. 4, the task control module 103 is executed to determine whether or not the periodic job 320 can be executed before the scheduled start time instant in a state in which there is room for the physical resources of the physical server 111. When the processing of a task control module illustrated in FIG. 15 is executed, the management server 201 assigns the job 320 to at least one of the plurality of virtual servers 109.

The task control module 103 refers to the task execution table 107 to check whether or not there is an unexecuted task in a status 505 (Step 1501). When there is an unexecuted task, the procedure advances to Step 1503 with the task selected, and when there is no unexecuted task, the processing is brought to an end (Step 1502).

The task control module 103 refers to the job table 118, the execution pattern table 108, and the resource usage status table 119 to check whether or not the task selected in Step 1501 can currently be executed on the physical server 111 (Step 1503). In this checking, first, the job is selected from the target 502 of the task execution table 107 for the physical server 111 on which the job targeted by the task is executed, and a server identifier 802 corresponding to a job identifier 801 of the job table 118 matching the identifier of the selected job is acquired.

Subsequently, the task control module 103 acquires the use degrees of the physical resources of the physical server 111 having the acquired server identifier 802 from a resource usage status 602 of the resource usage status table 119. Further, the task control module 103 uses a task identifier as a key to acquire the use degrees of the physical resources necessary for the execution of the task selected in Step 1501 from used resources 702 of the execution pattern table 108.

Subsequently, the task control module 103 acquires the acquired present use degrees of the physical resources and the degrees of the physical resources necessary for the task from the resource usage status 602, a task identifier 701, and the used resources 702, and determines whether or not the physical resources necessary for the execution of the task exist on the physical server 111 (Step 1504). This determination is performed as to whether or not the resource usage status 602 indicating the present use degrees of the physical resources can accommodate the used resources (use degrees of the physical resources) 702 necessary for the selected task. For example, the task control module 103 converts the degrees of the resource usage status 602 and the used resources 702 into numerical values, and when there is a physical server 111 for which a sum thereof is less than a threshold value set by the administrator or the system, determines that the physical resources that can execute the task exist, and the procedure advances to Step 1505.

On the other hand, when there is no physical server 111 for which the sum of the resource usage status 602 and the used resources 702 is less than the threshold value, the task control module 103 determines that the physical resources that can execute the task do not exist, and the processing is brought to an end.

In other words, in the determination of Step 1504, it is determined whether or not the physical resources of the physical server 111 have the sum of the resource usage status 602 and the used resources 702 less than the threshold value, and when the physical resources of the physical server 111 have the sum of the resource usage status 602 and the used resources 702 less than the threshold value, it is determined that the task can be executed on the physical server 111. In this case, the resource usage status 602 and the used resources 702 have the values of "light", "medium", and "heavy" of use degrees 603 to 605 and 703 to 705 of the computer resources converted into predetermined numerical values, and when a sum of the use degrees 603 to 605 and 703 to 705 of the computer resources is less than a predetermined threshold value, the task control module 103 determines that the task can be executed on the currently-selected physical server 111, and when not, determines that the task cannot be executed thereon.

In Step 1505, with regard to the task selected in Step 1501, the task control module 103 changes the execution start time instant 503 of the task execution table 107 to the current time instant.

The task control module 103 periodically refers to the task execution table 107 to instruct the virtual server 109 to execute the task having the execution start time instant 503 behind the present time instant, and hence the task for which the start time instant 503 is changed in Step 1505 can be executed instantaneously.

According to this embodiment, the task control module 103 controls the virtual server 109 to instantaneously execute the task for the periodic job 320 in the state in which there is room for the physical resources of the physical server 111, to thereby enable reduction in a risk that a task assigned to the periodic job 320 cannot finish being processed before a target completion time instant.

It should be noted that the first embodiment has described the example in which the task is instantaneously executed in a case where there is room for the physical resources of the physical server 111, but the execution start time instant 503 may be set so as to move the start time instant of the task up toward a present time instant. In other words, the execution start time instant 503 is set to a time instant between the present time instant and a saved execution start time instant.

(Second Embodiment)

In the above-mentioned first embodiment, the description has been made of the processing control method including the step of controlling the task for the periodic job 320 to be instantaneously executed in the state in which there is room for the physical resources of the physical server 111 at a present time point. In a second embodiment, a description is made of a processing control method including a step of controlling an execution start of the task for the periodic job 320 to be scheduled in the state in which there is room for the physical resources of the physical server 111 after the present time point.

Figure 20:
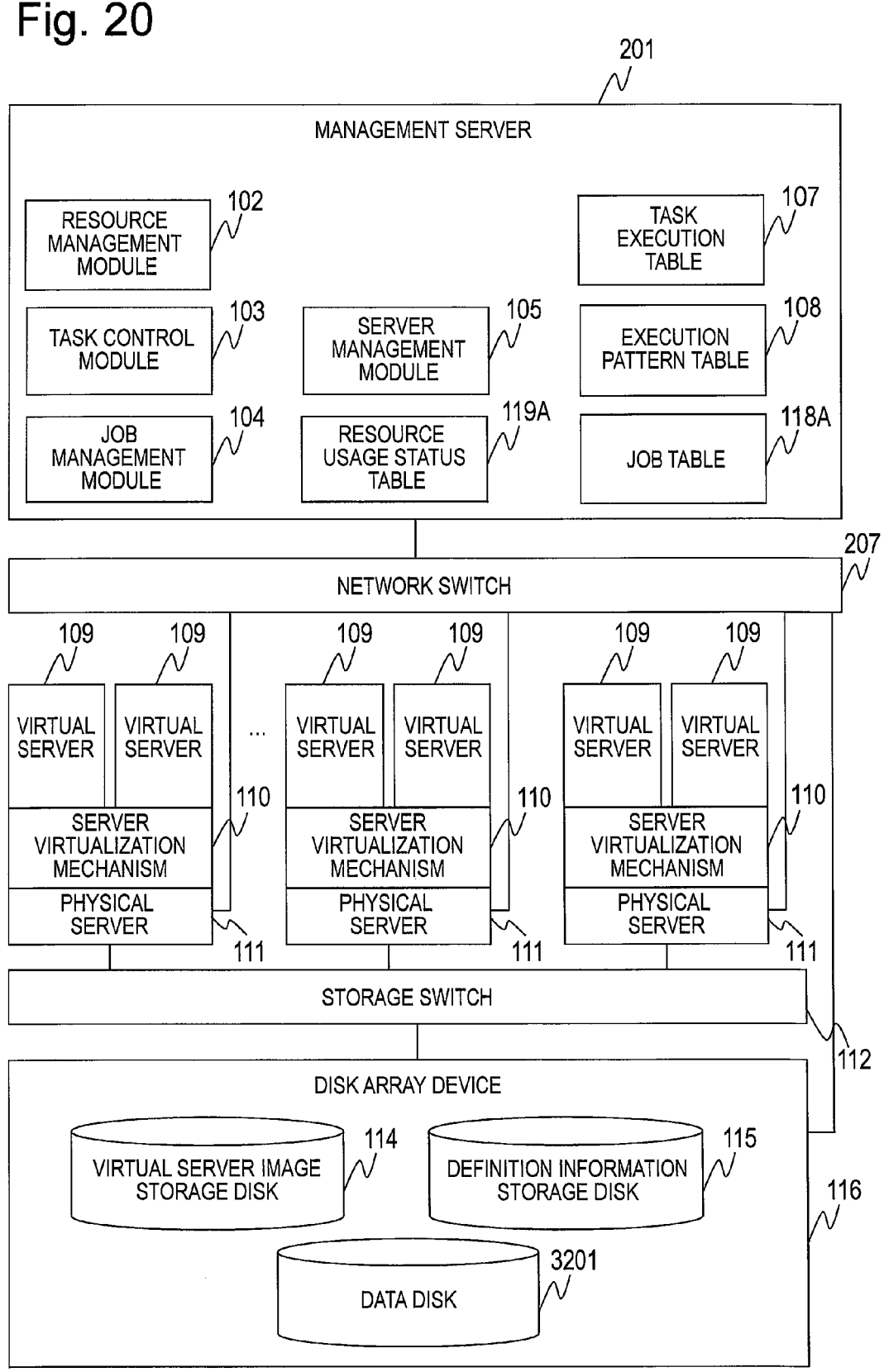
FIG. 20 is a block diagram illustrating a configuration of a computer system according to the second embodiment of this invention.

FIG. 20 is a block diagram illustrating a configuration of a computer system according to the second embodiment of this invention. The computer system according to the second embodiment includes a resource usage status table 119A and a job table 118A obtained by changing the resource usage status table 119 and the job table 118 according to the above-mentioned first embodiment. The other components are the same as the above-mentioned first embodiment.

Figure 9:
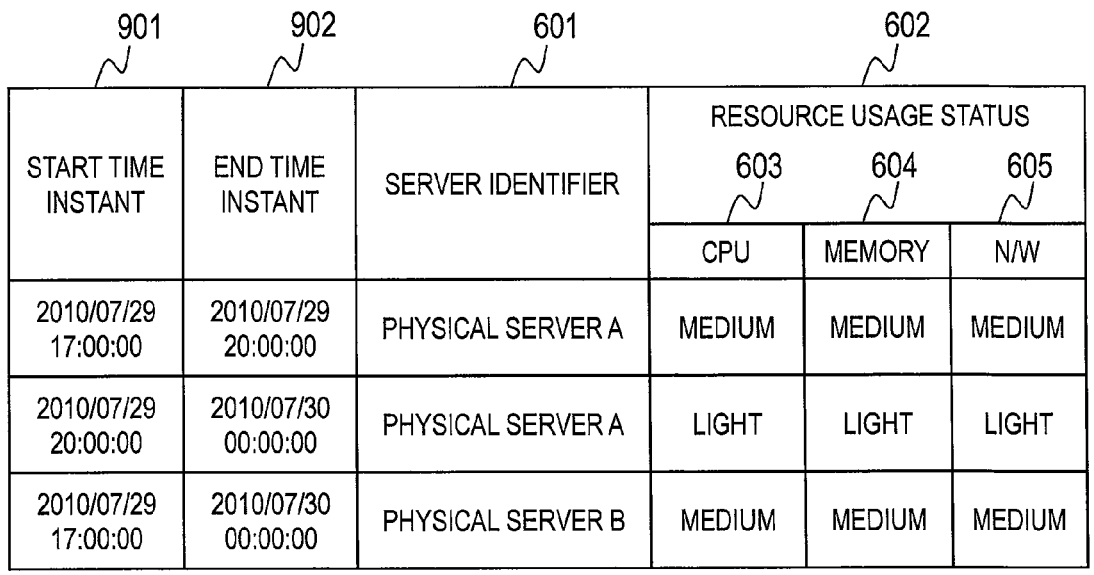
FIG. 9 illustrates an example of the resource usage status table according to a second embodiment of this invention.

FIG. 9 illustrates an example of the resource usage status table 119A according to the second embodiment. In the resource usage status table 119A according to the second embodiment illustrated in FIG. 9, a column 901 and a column 902 are newly added to the resource usage status table according to the above-mentioned first embodiment (FIG. 6) in order to retain information indicating transition of the resource usage status from the current time instant. The other components are the same as the resource usage status table 119 according to the above-mentioned first embodiment. The column 901 indicates a time instant at which the resource usage status of the physical server 111 indicated by the column 601 and the column 602 starts. The column 902 indicates a time instant at which the resource usage status of the physical server 111 indicated by the column 601 and the column 602 ends. In the resource usage status table 119A illustrated in FIG. 9, estimated values of the resource usage status 602 (for example, statistical values for each time slot) for a predetermined period (for example, 24 hours) are set in advance by the administrator or the like for each physical server 111 (physical server identifier 601). It should be noted that the values of the column 901 and the column 902 are determined based on job characteristics 1001 of each job 320 described later with reference to FIG. 10.

FIG. 10 illustrates an example of the job table 118A according to the second embodiment. In the job table 118A according to the second embodiment illustrated in FIG. 10, a column 1001, a column 1002, a column 1003, a column 1004, a column 1005, a column 1006, and a column 1007 are newly added to the job table 118 (FIG. 8) according to the above-mentioned first embodiment in order to retain information indicating transition of load on each job from the current time instant. The other components are the same as the job table 118 according to the above-mentioned first embodiment.

The column 1001 indicates a load characteristic of each job 320. The column 1001 includes, as the sub-columns, the column 1002, the column 1006, and the column 1007. The column 1002 includes the load characteristic of the job 320. The column 1002 includes, as the sub-columns, the column 1003, the column 1004, and the column 1005, each of which indicates the use degree of each of the physical components (such as CPU, memory, and N/W bandwidth) included in the physical server 111. The job table 118A may include columns that store the use degrees of the disk I/O bandwidth, the disk area, and the like separately from the column 1003, the column 1004, and the column 1005.

The values of the column 1003, the column 1004, and the column 1005 are set in advance for each time slot (ranging from start time instant 1006 to end time instant 1007) based on the settings made by the administrator, the load information collected in the past task execution, and the like. The column 1006 indicates a time instant (start point of time slot) at which the load characteristic indicated by the column 1002 starts. The column 1007 indicates a time instant (end point of time slot) at which the load characteristic indicated by the column 1002 ends.

The time slot (start time instant 1006 and end time instant 1007) and a load characteristic 1002 set in the job table 118A of FIG. 10 are reflected on a start time instant 901 and an end time instant 902 of the time slot of FIG. 9 and the resource usage status 602. In other words, in the resource usage status table 119A and the job table 118A according to the second embodiment, estimated values (or predicted values) of the load characteristic and the resource usage status after the present are set for each time slot.

Figure 16:
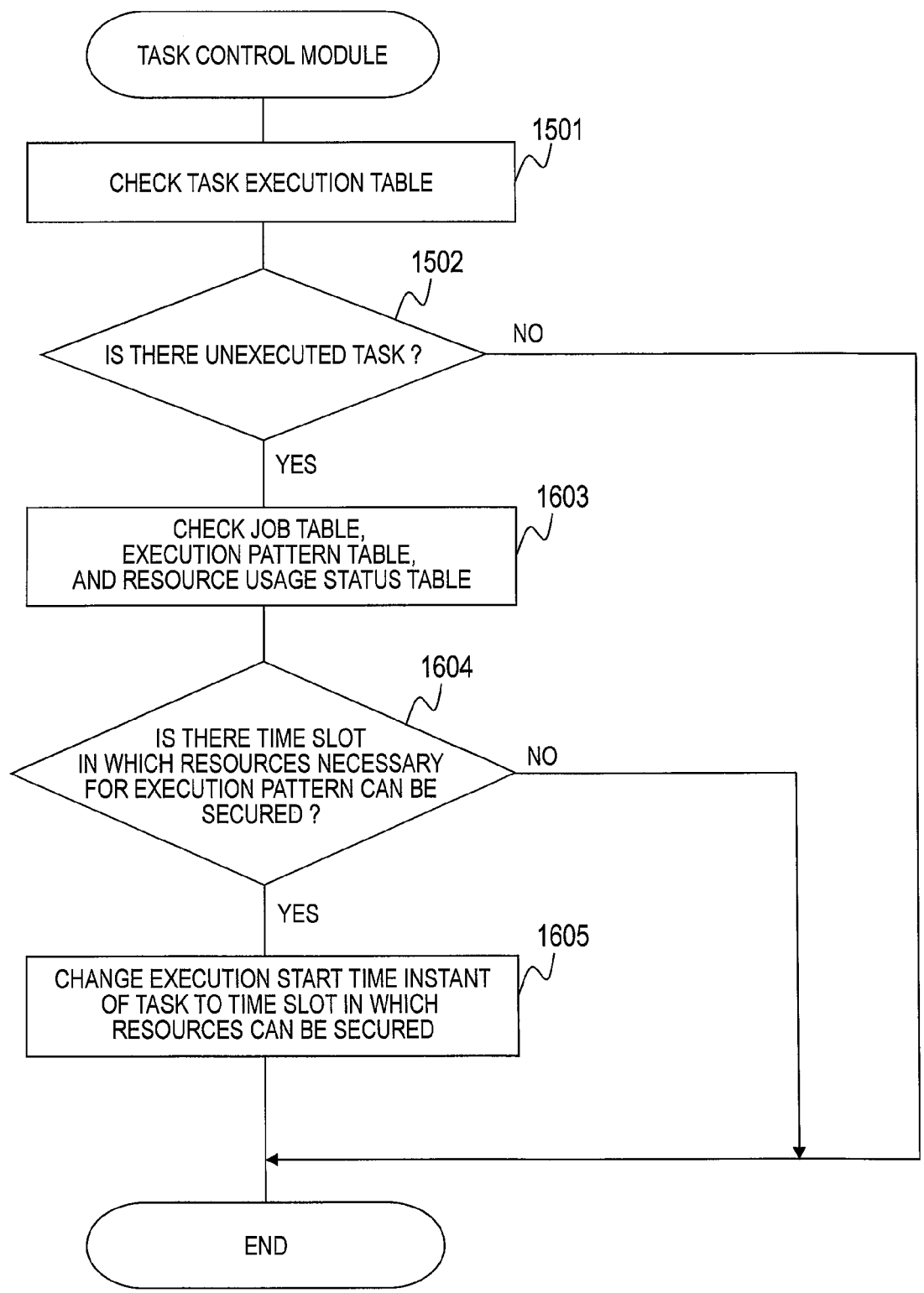
FIG. 16 is a flowchart illustrating an example of processing executed by the task control module according to the second embodiment of this invention.

FIG. 16 is a flowchart illustrating an example of processing executed by the task control module 103 according to the second embodiment. FIG. 16 illustrates the processing obtained by partially changing the processing of the task control module 103 according to the above-mentioned first embodiment (FIG. 15). In other words, the processing according to the second embodiment illustrated in FIG. 16 is obtained by substituting Step 1503, Step 1504, and Step 1505 of the processing according to the above-mentioned first embodiment (FIG. 15) by Step 1603, Step 1604, and Step 1605. It should be noted that the other steps are the same as the above-mentioned first embodiment.

In the same manner as the above-mentioned first embodiment, the task control module 103 executes the processing of Steps 1501 and 1502 to select the unexecuted task. Then, after YES is determined in Step 1502 the task control module 103 refers to the job table 118A, the execution pattern table 108, and the resource usage status table 119 to check whether or not there is a time slot in which the task selected in Step 1501 can be executed on the physical server 111 (Step 1603). In this checking, first, the job 320 is selected from the target 502 of the task execution table 107 illustrated in FIG. 5 for the physical server 111 on which the job 320 targeted by the task is executed, and the server identifier 802 corresponding to the job identifier 801 of the job table 118A matching the identifier of the selected job is acquired.

Subsequently, the task control module 103 acquires the use degrees of the physical resources of the physical server 111 having the acquired server identifier 802 from the resource usage status 602 of the resource usage status table 119A. At this time, the task control module 103 selects a record in which the time slot indicated by the column 901 and the column 902 of the resource usage status table 119A includes the time slot indicated by the column 503 (start time instant) and the column 504 (end time instant) of the task execution table 107, and acquires the resource usage status of the selected record.

Subsequently, the task control module 103 acquires the acquired use degrees of the physical resources, the degrees of the physical resources necessary for the task, the resource usage status of the column 602 within the resource usage status table 119A of FIG. 9, and the column 702 (used resource amount) that matches the task currently indicated by the column 701 (task identifier) within the execution pattern table 108.

Then, the task control module 103 compares the resource usage status of the column 602 within the resource usage status table 119A with the used resources of the column 702 within the execution pattern table 108 to determine whether or not the physical resources necessary for the execution of the task exist on the physical server 111. In this determination, when the sum of the resource usage status of the column 602 and the used resources of the column 702 is less than the threshold value set in advance, it is possible to determine that the task can be executed in the time slot indicated by the column 901 and the column 902 within the resource usage status table 119A. In this determination, for example, in the same manner as in the above-mentioned first embodiment, the values of "light", "medium", and "heavy" of use degrees 603 to 605 and 703 to 705 of the computer resources are converted into predetermined numerical values, and when a sum of the use degrees 603 to 605 and 703 to 705 of the computer resources is less than a predetermined threshold value, the task control module 103 determines that the task can be executed on the currently-selected physical server 111, and when not, determines that the task cannot be executed thereon.

The task control module 103 advances to Step 1605 when determining in Step 1603 that the physical resources necessary for the execution of the task exist, and when determining the physical resources necessary for the execution of the task do not exist, brings the processing to an end (Step 1604). In this case, the task control module 103 selects a record having the earliest start time instant 901 among the records of the resource usage status table 119A for which it has been determined that the task can be executed on the currently-selected physical server 111. It should be noted that when the selected start time instant 901 is later than the start time instant 503 of the task, the task control module 103 may determine that the task cannot be executed on the physical server 111 and inhibit the start time instant 503 from being updated in Step 1605.

In order to execute the task selected in Step 1501, the task control module 103 changes the start time instant 503 of the task within the task execution table 107 to the start time instant 901 included in the record selected in Step 1604 (Step 1605).

The task control module 103 periodically refers to the task execution table 107 to instruct the virtual server 109 to execute the task having the execution start time instant 503 behind the present time instant, and hence the task for which the start time instant 503 is changed in Step 1605 can be executed in advance in a time slot in which there is room for the physical resources of the physical server 111.

According to this embodiment, the task control module 103 schedules the execution start of the task assigned to the periodic job 320 in the state in which there is room for the physical resources of the physical server 111 after the present time point, to thereby increase the number of tasks that can be executed before an execution plan of the task planned in the task execution table 107, to thereby enable the reduction in the risk that the task cannot finish being processed before the target completion time instant.

(Third Embodiment)

In the above-mentioned second embodiment, the description is made of the processing control method including the step of controlling the task for the periodic job 320 to be scheduled in the state in which there is room for the physical resources of the physical server 111 after the present time point. In a third embodiment, a description is made of a processing control method performed in a case where there are a plurality of physical servers that can execute the task.

Figure 21:
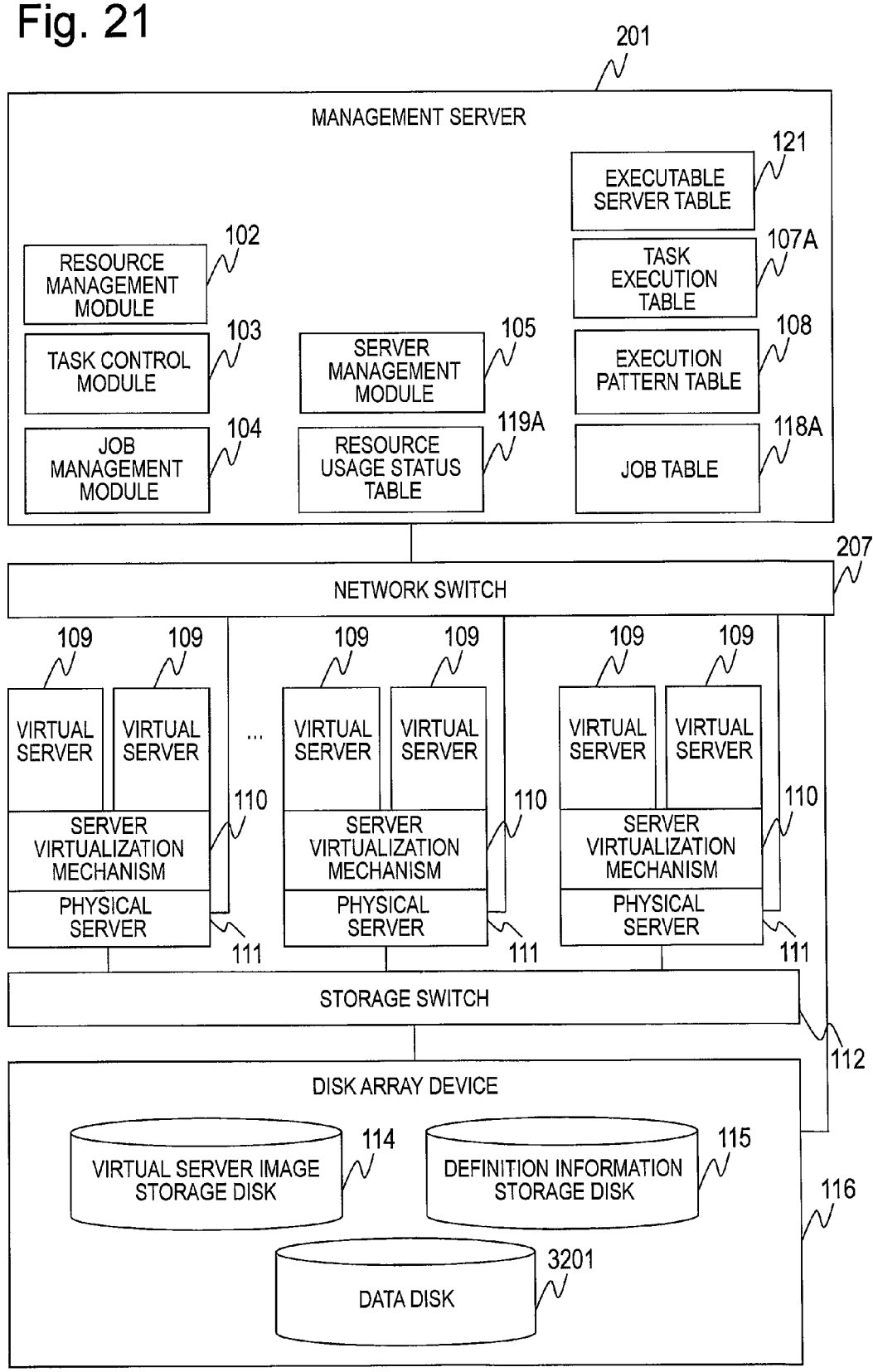
FIG. 21 is a block diagram illustrating a configuration of a computer system according to a third embodiment of this invention.

FIG. 21 is a block diagram illustrating a configuration of a computer system according to the third embodiment of this invention. The computer system according to the third embodiment includes an executable server table 121 added to the management server 201 according to the above-mentioned second embodiment and a task execution table 107A obtained by changing the task execution table 107 according to the above-mentioned first and second embodiments. The other components are the same as the above-mentioned second embodiment.

FIG. 12 illustrates an example of the task execution table 107A according to the third embodiment. The task execution table 107A illustrated in FIG. 12 is obtained by adding an executed place 1201 for storing the identifier of the physical server 111 that executes the task to the task execution table 107 according to the above-mentioned first and second embodiments (FIG. 5). The other components are the same as the task execution table 107 according to the above-mentioned first and second embodiments.

FIG. 11 illustrates an example of the executable server table 121 according to the third embodiment. The executable server table 121 illustrated in FIG. 11 retains a relationship among each task indicated in the task execution table 107A, each job targeted by each task, and the physical server 111 that can execute the task.

A column 1101 indicates the identifier for indicating the description of the task. As this identifier, the same identifier as the task identifier used for the column 501 of the task execution table 107A is used.

A column 1102 indicates the identifier for indicating the job for which the task indicated by the column 1001 is to be executed. As this identifier, the same identifier as the identifier of the job 320 stored in the column 502 of the task execution table 107A is used.

A column 1103 stores the identifiers of the physical servers that can execute the task of the column 501 within the task execution table 107A. The column 1103 includes, as the sub-columns, a column 1104 and a column 1105. Each of the column 1104 and the column 1105 is set for each identifier for identifying the physical server 111. This embodiment is described on the assumption that the column 1103 has two sub-columns, but it may suffice that the number of sub-columns is the same as the number of physical servers 111 existing on the computer system. In the example illustrated in FIG. 11, values set in the column 1104 relating to a physical server A for each task identifier of the column 1101 include "o" which is set in a case where the task relating to a target job of the column 1102 can be executed on the physical server A and "-" which is set in a case where the task cannot be executed thereon. In the same manner, values set in the column 1105 include "o" which is set for a combination of a task (1101) and a job (1102) that can be executed on a physical server B and "-" which is set in a case where the combination of the task and the job cannot be executed on the physical server B.

The values of the column 1104 and the column 1105 can be determined based on the configuration information collected by the management server 201 from the server management module 105 and the virtual server management module 310. For example, in a case of a backup task, in a case where the backup is executed by file transfer via the network, when the physical server 111 for the target job of the column 1102 is coupled to the network 207A, it is determined that the task can be executed, and when the physical server 111 for the target job is not coupled to the network 207A, it is determined that the task cannot be executed, which allows the executable server table 121 to be set based on the determination results.

A relationship between a task identifier 1101 and a target job 1102 within the executable server table 121 of FIG. 11 can be set by the administrator who uses the management server 201.

Figure 17:
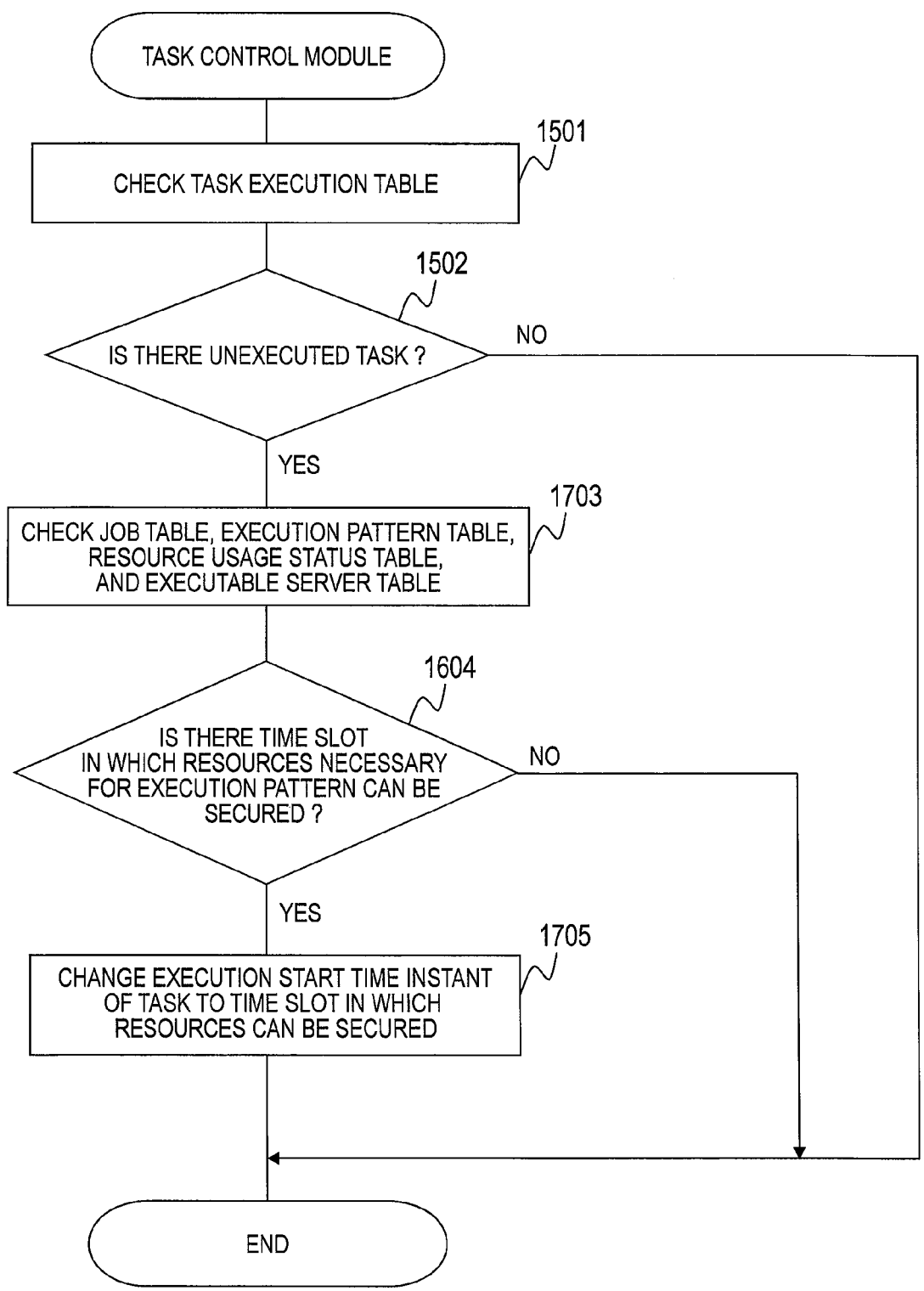
FIG. 17 is a flowchart illustrating an example of processing executed by the task control module according to the third embodiment of this invention.

FIG. 17 is a flowchart illustrating an example of processing executed by the task control module 103 according to the third embodiment. FIG. 17 is obtained by substituting Steps 1603 and 1605 of the processing of the task control module 103 according to the above-mentioned second embodiment (FIG. 16) by Steps 1703 and 1705. It should be noted that the other steps are the same as the above-mentioned second embodiment.

In the same manner as the above-mentioned first embodiment, the task control module 103 executes the processing of Steps 1501 and 1502 to select the unexecuted task. Then, after YES is determined in Step 1502, the task control module 103 checks whether or not there is a time slot in which the task selected in Step 1501 can be executed on the physical server 111 (Step 1703). In this example, the task control module 103 refers to the executable server table 121 to acquire the identifier of the physical server 111 that can execute the selected task and acquire a server identifier of the physical server for which "o" is stored in an executable server 1103, and in the same manner as the second embodiment, refers to the resource usage status table 119A to search for the time slot in which the selected task can be executed. In other words, extracted from the resource usage status table 119A is the time slot that is defined by the start time instant 901 and the end time instant 902 corresponding to the acquired server identifier and that includes the start time instant 503 and an end time instant 504 of the task selected in Step 1502.

Then, the task control module 103 determines whether or not there exists a time slot that is extracted in the same manner as in Step 1604 of the second embodiment and that corresponds to the resource usage status 602 that satisfies the physical resources necessary for the execution of the task (Step 1604).

When there exists a time slot corresponding to the resource usage status 602 that satisfies the physical resources necessary for the execution of the task, the task control module 103 stores the identifier of the physical server 111 corresponding to the time slot that satisfies the physical resources in the record of the resource usage status table 119A selected in Step 1604, in the executed place 1201 within the task execution table 107A. Then, in the same manner as the second embodiment, the task control module 103 changes the start time instant 503 within the task execution table 107A to the start time instant 901 included in the record selected in the resource usage status table 119A as the start time instant of an entry of the selected task (Step 1705).

The task control module 103 periodically refers to the task execution table 107 to instruct the virtual server 109 on the physical server 111 of the executed place 1201 to execute the task having the execution start time instant 503 behind the present time instant, and hence the start time instant 503 is changed in Step 1705, which allows the task for which the executed place 1201 is set to be executed in advance by the physical server 111 having the earliest start time instant 901 in the time slot in which there is room for the physical resources.

According to this embodiment, in the case where there are a plurality of physical servers that can execute the task, the task control module 103 schedules the physical server 111 corresponding to the time slot in which there is room for the physical resources to execute the task for the periodic job 320, and increases the number of tasks that can be executed before an original start time instant, to thereby enable the reduction in the risk that the task cannot finish being processed before the target completion time instant.

It should be noted that the third embodiment has described the example in which each of a plurality of time slots is set for each of a plurality of physical servers 111, but in the same manner as the above-mentioned first embodiment, the physical server 111 of which there is room for the physical resources at the present time instant may be selected to execute the task.

(Fourth Embodiment)

In the above-mentioned third embodiment, the description has been made of the processing control method performed in the case where there are a plurality of physical servers 111 that can execute the task. In a fourth embodiment, a description is made of a processing control method performed in a case where there are a plurality of execution patterns of the task. For example, in the case where the task is the backup, there are a plurality of patterns such as the backup at a file system level in cooperation with agent software of the virtual server 109, the backup at a virtual server level in cooperation with a snapshot function of virtualization software (server virtualization module 110), and the backup at a logical volume level in cooperation with a volume copy function of the disk array device 116 (storage device). Those methods of executing the backup tasks are different in an execution time, coverage, consistency with an application, and the necessary physical resources.

For example, in the backup at the file system level, the consistency with the application is highest, but there occur influences on performance of the job 320. In the backup at the logical volume level, backup processing can be executed on the storage device, and hence the influences on the performance of the job 320 are small, but there is a fear that the backup may not be performed while the job 320 is running.

Figure 22:
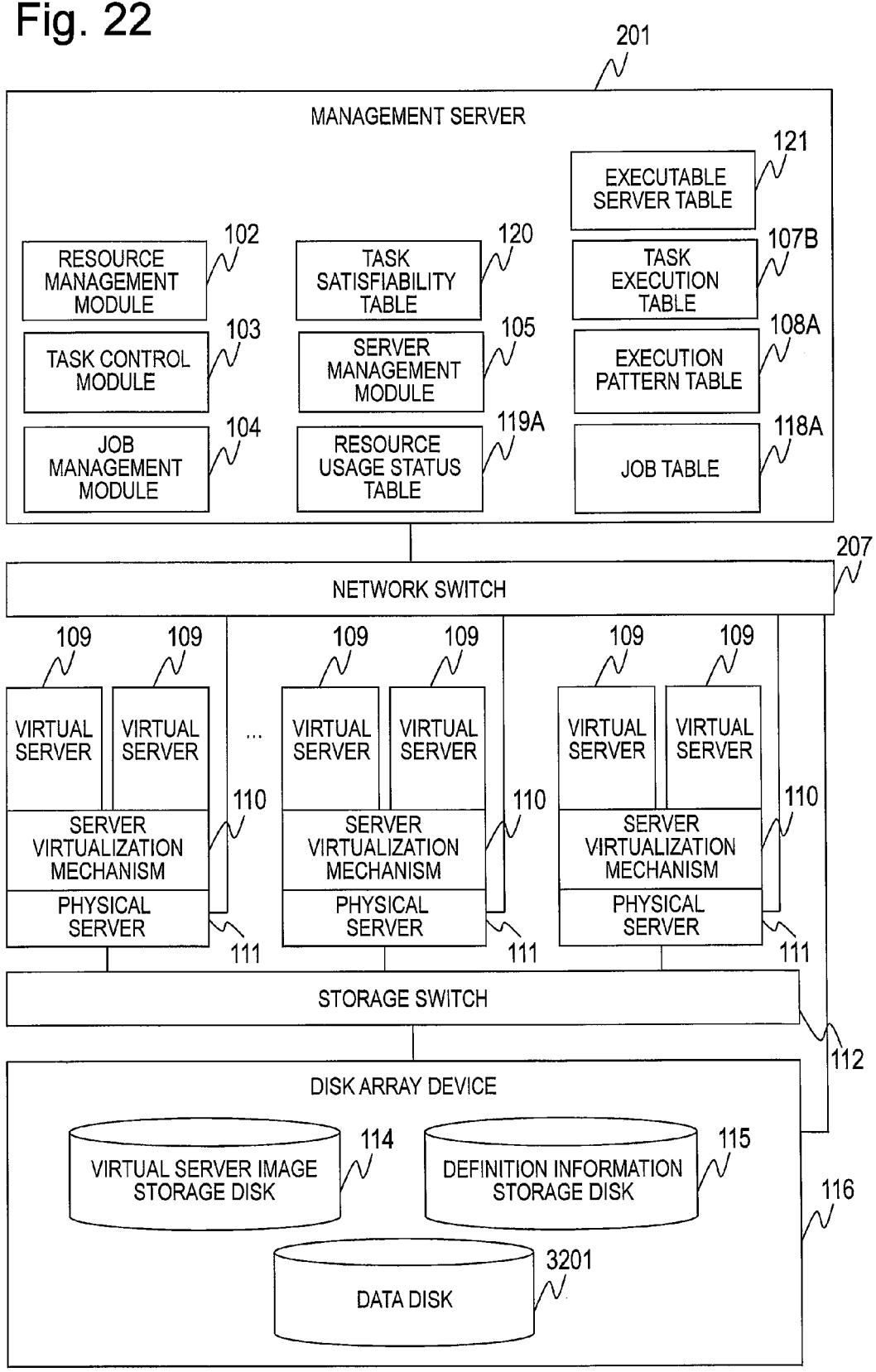
FIG. 22 is a block diagram illustrating a configuration of a computer system according to a third embodiment of this invention.

In the fourth embodiment, as illustrated in FIG. 22, a task satisfiability table 120 is newly used. FIG. 22 is a block diagram illustrating the fourth embodiment of this invention and illustrating a configuration of a computer system according thereto. The computer system according to the fourth embodiment includes the task satisfiability table 120 added to the management server 201 according to the third embodiment, an execution pattern table 108A obtained by adding a change to the execution pattern table 108 according to the first embodiment, and a task execution table 107B obtained by adding a change to the task execution table 107A according to the third embodiment, and the other components are the same as the third embodiment.

FIG. 13 illustrates an example of the task satisfiability table 120. The task satisfiability table (task information table) 120 retains information indicating a range of the job 320 covered by the execution of each task. As many the task satisfiability tables 120 as the task identifiers 501 are prepared. With reference to FIG. 13, a description is made of a task satisfiability table relating to the backup. A column 1301 indicates descriptions of specific (detailed) execution patterns of the task. In the example illustrated in the figure, "backup of file system" indicates the backup at the file system level in cooperation with the agent software of the virtual server 109, "copy of logical volume" indicates the backup at the logical volume level using the volume copy function of the disk array device 116 (storage device), and creation of snapshot" indicates the backup at a virtual server 109 level using the snapshot function of the server virtualization module 110.

A column 1302 stores the identifier indicating the job 320 for which the execution pattern of the task of the column 1301 is to be executed. As this identifier, the same identifier as the identifier of the column 502 (target job) of the task execution table 107A of FIG. 12 is used. A column 1306 indicates a priority of the execution pattern indicated by the column 1301. The value of the column 1306 is set by the administrator based on the characteristics of the execution pattern. For example, the backup of the file system is superior to the copy of the logical volume in the consistency with the application, and therefore has a high priority. It should be noted that coverage 2001 of the task satisfiability table 120 is used in the fifth embodiment described later, and hence a description thereof is omitted here.

FIG. 14 illustrates an example of the task execution table 107B. The task execution table 107B illustrated in FIG. 14 is obtained by adding an execution pattern 1401 indicating detailed descriptions of the task to the task execution table 107A according to the above-mentioned third embodiment (FIG. 12). The other components are the same as the task execution table 107A according to the above-mentioned third embodiment.

FIG. 18 is an example of the execution pattern table 108A, illustrating an example of the execution pattern table 108A relating to the backup.

The execution pattern table 108A is obtained by adding a pattern 1801 to the execution pattern table 108 according to the first embodiment illustrated in FIG. 7, and the other components are the same as the execution pattern table 108 according to the first embodiment. The pattern 1801 stores the execution pattern of the task identified by the task identifier 701. In the example illustrated in the figure, the "backup of file system" indicates the backup at the file system level in cooperation with the agent software of the virtual server 109, the "copy of logical volume" indicates the backup at the logical volume level using the volume copy function of the disk array device 116 (storage device), and the "creation of snapshot" indicates the backup at a virtual server 109 level using the snapshot function of the server virtualization module 110.

Figure 19:
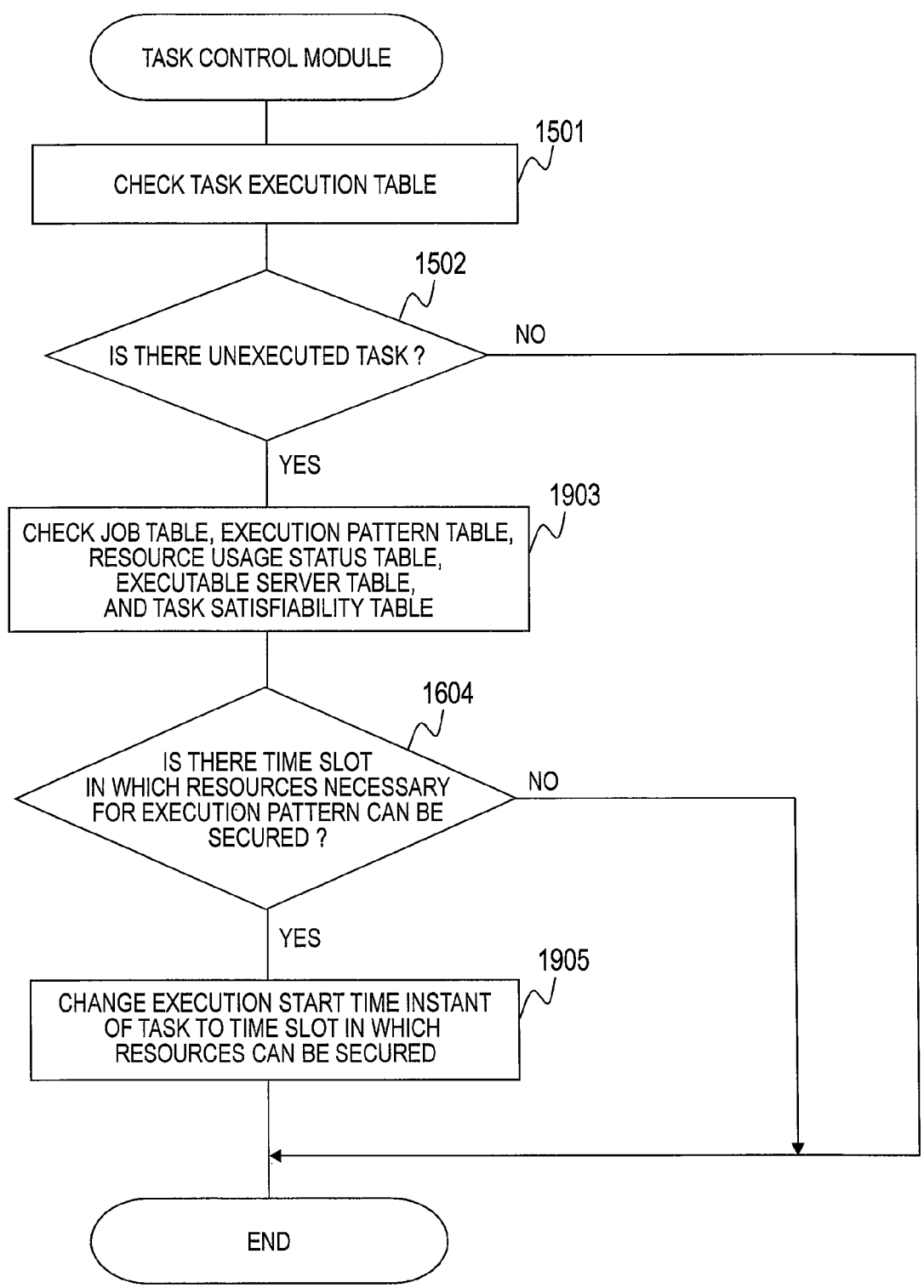
FIG. 19 is a flowchart illustrating an example of processing executed by the task control module according to the fourth embodiment of this invention.

FIG. 19 is a flowchart illustrating an example of processing executed by the task control module 103 according to the fourth embodiment. The flowchart illustrated in FIG. 19 is obtained by substituting Step 1703 and Step 1705 of the third embodiment illustrated in FIG. 17 by Step 1903 and Step 1905. It should be noted that the other steps are the same as the above-mentioned third embodiment.

In the same manner as the above-mentioned first embodiment, the task control module 103 executes the processing of Steps 1501 and 1502 to select the unexecuted task. Then, after YES is determined in Step 1502, the task control module 103 checks whether or not there is a time slot in which the unexecuted task selected in Step 1501 can be executed on the physical server 111 (Step 1903). In this example, in addition to the description of Step 1703 of FIG. 17, the task control module 103 refers to the task satisfiability table 120. In Step 1903, the task satisfiability table 120 corresponding to the task identifier (in this example, backup) indicated by the column 501 of the task execution table 107B is referred to. The task control module 103 selects a pattern 1301 that has never been selected in this processing and has the highest priority 1306. The task control module 103 selects the selected pattern 1301 from the pattern 1801 of the execution pattern table 108A (FIG. 18), and acquires the used resource amount 702 described in the selected record.

Then, in the same manner as the second embodiment, the task control module 103 determines whether or not there is a time slot in which a necessary physical resource amount 702 can be secured on the physical server 111. When there is no time slot in which the physical resource amount 702 can be secured, it is determined that the selected pattern 1301 cannot be executed, and the pattern 1301 corresponding to the column 1306 indicating the next highest priority is selected (Step 1903). This processing is performed in order from the highest priority to the lowest priority, and when there is no time slot in which the physical resource amount 702 can be secured, this processing can be brought to an end (Step 1604).

The task control module 103 acquires the start time instant 901 and the server identifier 601 of the corresponding record (in which there exists a time slot for the resource usage status 602 that satisfies the physical resources necessary for the execution of the task) within the resource usage status table 119A selected in Step 1604, and updates the task execution table 107B from the pattern 1301 selected in the task satisfiability table 120. In this update, the task control module 103 stores the task identifier and the job 320 selected in Step 1501 in the task identifier 501 and the target job 502 of the task execution table 107B, respectively, stores the start time instant 901 of the corresponding record of the resource usage status table 119A in the start time instant 503 of the task execution table 107B, stores the server identifier 601 of the resource usage status table 119A in the executed place 1201 of the task execution table 107B, stores the pattern 1301 selected in the task satisfiability table 120 in a pattern 1401 of the task execution table 107B, and sets the status 505 to "unexecuted" (Step 1905).

The task control module 103 periodically refers to the task execution table 107 to instruct the virtual server 109 on the physical server 111 of the executed place 1201 to execute the task having the execution start time instant 503 behind the present time instant in accordance with the pattern 1301, and hence the start time instant 503 is changed in Step 1905, which allows the task of the pattern 1401 for which the executed place 1201 is set to be executed in advance by the physical server 111 in the time slot in which there is room for the physical resources.

According to this embodiment, the task control module 103 selects the execution pattern of the task whose execution pattern has a high priority in the task satisfiability table 120, and increases the task that can be executed before the original start time instant, to thereby enable the reduction in the risk that the task cannot finish being processed before the target completion time instant.

(Fifth Embodiment)

In the above-mentioned fourth embodiment, the description has been made of the processing control method performed in the case where there are a plurality of execution patterns of the task. However, in an environment in which a system configuration is dynamically changed by migration of the virtual server 109 or the like, there is a fear that the priority determined in the fourth embodiment may be inappropriate.

In a fifth embodiment, a description is made of a processing control method using the coverage of each execution pattern of the task, which affects the execution time of the task, as information for dynamically determining the priority of each execution pattern. It should be noted that the fifth embodiment uses the same configuration as the fourth embodiment illustrated in FIG. 22.

In the coverage of the plurality of execution patterns of the task, for example, the backup at the file system level and the backup at the virtual server level need to be performed as often as the number of virtual servers 109, but the backup at the logical volume level allows the collective backup of the plurality of virtual servers 109 that share the volume.

In this fifth embodiment, the coverage 2001 is newly added to the task satisfiability table 120 (FIG. 13). The coverage 2001 is used by the task control module 103 to determine or update the priority of the column 1306 by calculation of numerical values or the like. In the fifth embodiment, the coverage 2001 indicates the job 320 corresponding to the coverage of the detailed pattern of the task indicated by the pattern 1301. The coverage 2001 includes, as the sub-columns, a column 2002 and a column 2003. The column 2002 and the column 2003 are provided for each identifier for identifying the job, and store information indicating whether or not the task of the pattern 1301 can be executed. It should be noted that as the identifiers of the column 2002 and the column 2003, the same identifier as a job identifier of the column 502 within the task execution table 107B is used.

In the example illustrated in FIG. 13, the column 2002 indicates "Job A", and the column 2003 indicates "Job B". As the information indicating whether or not the task of the pattern 1301 can be executed, "o" or "-" is set. Those values are set by the administrator. This information is set to "o" when the pattern 1301 can be executed and "-" when the pattern 1301 cannot be executed.

In the example illustrated in FIG. 13, with the pattern 1301 being the "backup of file system", when a target job 1302 is "Job A", the coverage indicates that only the column 2002 for Job A can be executed. On the other hand, with the pattern 1301 being the "copy of logical volume", when the target job 1302 is "Job A", the coverage indicates that an execution pattern 1301 of the task is performed for both Job A and Job B of the columns 2002 and 2003 for Job A. It should be noted that this example shows the case where the pattern 1301 of the task is executed for Job A and Job B because Job A and Job B use the same logical volume of the disk array device 116. In the copy of the logical volume, the copy is performed in units of blocks on the same logical volume, and hence the copy is executed irrespective of a job-to-job-basis access range (file system or the like). Therefore, on condition that data on Job A and data on Job B are stored on the same logical volume, when the copy is performed on the logical volume for one of the jobs, the data on the other Job B is also copied.

Each value stored in the pattern of the column 1301 is set by the server management module 105 based on the information acquired from the resource management module 102 and the job management module 104. The fifth embodiment is described on the assumption that a column 2001 has two sub-columns, but it may suffice that the number of sub-columns is the same as the number of at least one job existing on the system.

In Step 1903 illustrated in FIG. 19, the task control module 103 updates the priority of the column 1306 from the value of the column 2001. Examples of a method of updating this priority include a method of converting the coverage of the column 2001 and the priority of the column 1306 into numerical values and assigning weights thereto, but another calculation method may be used. For example, it is possible to perform the calculation of numerical values for assuming that the information of the columns 2002 and 2003 indicating whether or not to execute the pattern 1301 is set as "1" for "o" and "0" for "-" and that the priority of the column 1306 is set as "3", "2", and "1" for "heavy", "medium", and "light" in the stated order, acquiring a sum of the columns 2001 and 1306 for the pattern 1301 and the target job 1302 on a record-to-record basis, and setting the priority again in descending order of this sum.

According to the fifth embodiment, the task control module 103 can determine the priority that occurs among a plurality of task execution patterns in the state in which the system configuration is dynamically changed.

It should be noted that the above-mentioned first to fifth embodiments have been described by taking the example of executing the job 320 on the virtual server 109, but this invention can be applied to a computer system for executing the job 320 and the task on the physical server 111, to thereby enable the reduction in the risk that the task cannot finish being processed before the target completion time instant.

Though the detailed description has been given of this invention referring to the attached drawings, this invention is not limited to this specific configuration, and includes various variations and equivalent configurations within the scope of the accompanying claims.

As described above, this invention can be applied to a virtual computer system for providing the jobs on a virtual server and executing the tasks such as the backup and the batch job on a job-to-job basis.

What is claimed is:

1. A processing control method for controlling processing for a task related to a first job in a computer system,
wherein the computer system includes:
- a plurality of physical computers, each physical computer comprising a respective processor and a respective memory, wherein the respective processor is programmed by executable instructions to provide at least a respective first virtual computer and a respective second virtual computer on a respective physical computer, wherein each physical computer includes a communication interface for enabling communication over a network; and
- a management server able to communicate with the plurality of physical computers, the management server comprising a management processor and a management memory, the management processor programmed for managing processing of the task related to the first job, the management server retaining:
  - task execution information comprising a start time instant of the processing for the task and an end time instant of the processing for the task; and
  - task execution pattern information comprising a task processor usage amount, a task memory usage amount, and a task network bandwidth usage amount predicted to be used for executing the processing of the task, the processing control method comprising:
- collecting, by the management server, load information for each physical computer, wherein the load information includes computer processor usage, computer memory usage, and computer network bandwidth usage by respective jobs executing on respective ones of the virtual computers;
- determining, based on respective first thresholds and respective second thresholds, one of three usage degrees to correlate, respectively, to the task processor usage amount, the task memory usage amount, and the task network bandwidth usage amount, wherein the first usage degree corresponds to respective usage amounts less than the respective first thresholds, a second usage degree corresponds to respective usage amounts greater than the respective first thresholds and less than the respective second thresholds, and a third usage degree corresponds to respective usage amounts greater than the respective second thresholds;
- assigning the respective usage degrees to the load information for each physical machine by assigning a respective one of the three usage degrees for the computer processor usage, a respective one of the three usage degrees for the computer memory usage, and a respective one of the three usage degrees for the computer network bandwidth usage;
- assigning a numeric value to each of the respective first, second, and third usage degrees;
- adding together the numeric values assigned for each respective usage degree for the task processor usage amount, the task memory usage amount, and the task network bandwidth usage, and the numeric values for each respective usage degree for the computer processor usage, the computer memory usage, and the computer network bandwidth usage for the respective physical computers to determine a sum representing usage of resources on each physical computer if the task were to be executed thereon;
- determining, by the management server, a particular one of the physical computers from among the plurality of physical computers for which the sum is less than a threshold value;
- updating, by the management server, the start time instant of the processing for the task to a time instant closer to a present time instant; and
- referring, by the management server, to the task execution information to instruct the particular physical computer to start the processing for the task when the present time instant reaches the start time instant of the processing.

2. The processing control method according to claim 1, further comprising:
- determining that resource usage for the particular physical computer processing a particular lob is predicted to change from being unable to accommodate execution of the first task during execution of the particular lob during a first time period to being able to accommodate execution of the first task concurrently with execution of the particular lob during a second time period in which resource usage of the first lob decreases such that the sum is less than the threshold value during the second time period; and
- updating the start time instant to start processing of the task during the second time period.

3. The processing control method according to claim 1, further comprising:
- assigning, by the management server, the first job to a particular virtual machine on one of the plurality of physical computers and controlling particular virtual machine on the one of the plurality of physical computers to execute the assigned job.

4. The processing control method according to claim 1, wherein the determining, based on respective first thresholds and respective second thresholds, the three usage degrees comprises:
- determining for the processor usage a first processor usage threshold and a second processor usage threshold, wherein a first processor usage degree is below the first processor usage threshold, a second processor usage degree is between the first processor usage threshold and the second processor usage threshold, and a third processor usage degree is above the second processor usage threshold;
- determining for the memory usage a first memory usage threshold and a second memory usage threshold, wherein a first memory usage degree is below the first memory usage threshold, a second memory usage degree is between the first memory usage threshold and the second memory usage threshold, and a third memory usage degree is above the second memory usage threshold;
- determining for the network bandwidth usage a first network bandwidth usage threshold and a second network bandwidth usage threshold, wherein a first network bandwidth usage degree is below the first network bandwidth usage threshold, a second network bandwidth usage degree is between the first network bandwidth usage threshold and the second network bandwidth usage threshold, and a third network bandwidth usage degree of is above the second network bandwidth usage threshold.

5. The processing control method according to claim 4, further comprising:
assigning one of the first, second, or third processor usage degrees to the task processor usage amount based on comparing the task processor usage amount with the first processor usage threshold and the second processor usage threshold;
assigning one of the first, second, or third memory usage degrees to the task memory usage amount based on comparing the task memory usage amount with the first memory usage threshold and the second memory usage threshold; and
assigning one of the first, second, or third network bandwidth usage degrees to the task network bandwidth usage amount based on comparing the task network bandwidth usage amount with the first network bandwidth usage threshold and the second network bandwidth usage threshold.

6. The processing control method according to claim 1, wherein the task execution pattern information includes a plurality of execution patterns for completing different portions of the task, including a first task processor usage amount, a first task memory usage amount, and a first task network bandwidth usage amount for executing a first portion of the task, and a second task processor usage amount, a second task memory usage amount, and a second task network bandwidth usage amount for executing a second portion of the task, and the first portion of the task has a different priority than the second portion of the task, the method further comprising:
selecting the portion of the task having a higher priority to determine the sum value and subsequently selecting the portion of the task having a lower priority to determine the sum if the sum determined using the higher priority portion exceeds the threshold value.

7. A computer system comprising:
a plurality of physical computers, each physical computer comprising a respective processor and a respective memory, wherein the respective processor is programmed by executable instructions to provide at least a respective first virtual computer and a respective second virtual computer on a respective physical computer, wherein each physical computer includes a communication interface for enabling communication over a network;
a management server able to communicate with the plurality of physical computers, the management server comprising a management processor and a management memory, the management processor programmed for managing processing of a task related to a first job executed on one of the physical computers, wherein:
the management server comprises an interface coupled to the processor, the memory, and the computer;
the management server retains:
task execution information comprising a start time instant of the processing for the task and an end time instant of the processing for the task; and
task execution pattern information comprising a task processor usage amount, a task memory usage amount, and a task network bandwidth usage amount predicted to be used for executing the processing of the task;
the management processor is programmed to perform operations comprising:
collecting load information for each physical computer, wherein the load information includes computer processor usage, computer memory usage, and computer network bandwidth usage by respective lobs executing on respective ones of the virtual computers;
determining, based on respective first thresholds and respective second thresholds, one of three usage degrees to correlate, respectively, to the task processor usage amount, the task memory usage amount, and the task network bandwidth usage amount, wherein the first usage degree corresponds to respective usage amounts less than the respective first thresholds, a second usage degree corresponds to respective usage amounts greater than the respective first thresholds and less than the respective second thresholds, and a third usage degree corresponds to respective usage amounts greater than the respective second thresholds;
assigning the respective usage degrees to the load information for each physical machine by assigning a respective one of the three usage degrees for the computer processor usage, a respective one of the three usage degrees for the computer memory usage, and a respective one of the three usage degrees for the computer network bandwidth usage;
assigning a numeric value to each of the respective first, second, and third usage degrees;
adding together the numeric values assigned for each respective usage degree for the task processor usage amount, the task memory usage amount, and the task network bandwidth usage, and the numeric values for each respective usage degree for the computer processor usage, the computer memory usage, and the computer network bandwidth usage for the respective physical computers to determine a sum representing usage of resources on each physical computer if the task were to be executed thereon;
determining a particular one of the physical computers from among the plurality of physical computers for which the sum is less than a threshold value;
updating the start time instant of the processing for the task to a time instant closer to a present time instant; and
referring to the task execution information to instruct the particular physical computer to start the processing for the task when the present time instant reaches the start time instant of the processing.

8. The computer system according to claim 7, wherein the management processor is further programmed to perform operations comprising:
determining that resource usage for the particular physical computer processing a particular lob is predicted to change from being unable to accommodate execution of the first task during execution of the particular job during a first time period to being able to accommodate execution of the first task concurrently with execution of the particular lob during a second time period in which resource usage of the first lob decreases such that the sum is less than the threshold value during the second time period; and
updating the start time instant to start processing of the task during the second time period.

9. The computer system according to claim 7, wherein the management processor is further programmed to perform operations comprising:

assigning the first job to a particular virtual machine on one of the plurality of physical computers and controlling the one of the plurality of physical computers to execute the assigned job.

10. The computer system according to claim 7, wherein the management processor is further programmed to determine, based on respective first thresholds and respective second thresholds, the three usage degrees by:
   determining for the processor usage a first processor usage threshold and a second processor usage threshold, wherein a first processor usage degree is below the first processor usage threshold, a second processor usage degree is between the first processor usage threshold and the second processor usage threshold, and a third processor usage degree is above the second processor usage threshold;
   determining for the memory usage a first memory usage threshold and a second memory usage threshold, wherein a first memory usage degree is below the first memory usage threshold, a second memory usage degree is between the first memory usage threshold and the second memory usage threshold, and a third memory usage degree is above the second memory usage threshold;
   determining for the network bandwidth usage a first network bandwidth usage threshold and a second network bandwidth usage threshold, wherein a first network bandwidth usage degree is below the first network bandwidth usage threshold, a second network bandwidth usage degree is between the first network bandwidth usage threshold and the second network bandwidth usage threshold, and a third network bandwidth usage degree of is above the second network bandwidth usage threshold.

11. The computer system according to claim 10, wherein the management processor is further programmed to perform operations comprising:
   assigning one of the first, second, or third processor usage degrees to the task processor usage amount based on comparing the task processor usage amount with the first processor usage threshold and the second processor usage threshold;
   assigning one of the first, second, or third memory usage degrees to the task memory usage amount based on comparing the task memory usage amount with the first memory usage threshold and the second memory usage threshold; and
   assigning one of the first, second, or third network bandwidth usage degrees to the task network bandwidth usage amount based on comparing the task network bandwidth usage amount with the first network bandwidth usage threshold and the second network bandwidth usage threshold.

12. The computer system according to claim 9, wherein the task execution pattern information includes a plurality of execution patterns for completing different portions of the task, including a first task processor usage amount, a first task memory usage amount, and a first task network bandwidth usage amount for executing a first portion of the task, and a second task processor usage amount, a second task memory usage amount, and a second task network bandwidth usage amount for executing a second portion of the task, and the first portion of the task has a different priority than the second portion of the task, wherein the management processor is further programmed to perform operations comprising:
   selecting the portion of the task having a higher priority to determine the sum value and subsequently selecting the portion of the task having a lower priority to determine the sum if the sum determined using the higher priority portion exceeds the threshold value.

\* \* \* \* \*